(12) United States Patent
Sala

(10) Patent No.: US 11,498,644 B2
(45) Date of Patent: Nov. 15, 2022

(54) REAR DERAILEUR OF BICYCLE

(71) Applicant: TIEN HSIN INDUSTRIES CO., LTD., Taichung (TW)

(72) Inventor: Alfredo Sala, Vedano al Lambro (IT)

(73) Assignee: TIEN HSIN INDUSTRIES CO., LTD., Taichung (TW)

( * ) Notice: Subject to any disclaimer, the term of this patent is extended or adjusted under 35 U.S.C. 154(b) by 357 days.

(21) Appl. No.: 16/801,977

(22) Filed: Feb. 26, 2020

(65) Prior Publication Data
US 2021/0129938 A1 May 6, 2021

(30) Foreign Application Priority Data

Nov. 6, 2019 (TW) ................................ 108140250

(51) Int. Cl.
| | |
|---|---|
| *B62M 9/122* | (2010.01) |
| *B62M 9/128* | (2010.01) |
| *B62M 9/1242* | (2010.01) |
| *B62M 9/124* | (2010.01) |

(52) U.S. Cl.
CPC ............ *B62M 9/122* (2013.01); *B62M 9/128* (2013.01); *B62M 9/1242* (2013.01); *B62M 2009/12406* (2013.01)

(58) Field of Classification Search
CPC ..... B62M 9/122; B62M 25/08; B62M 9/1242
USPC .......................................................... 474/82
See application file for complete search history.

(56) References Cited

U.S. PATENT DOCUMENTS

| | | | | |
|---|---|---|---|---|
| 5,480,356 A * | 1/1996 | Campagnolo | .......... | B62M 9/122 280/238 |
| 6,623,389 B1 * | 9/2003 | Campagnolo | .......... | B62M 25/08 474/70 |
| 7,467,567 B2 * | 12/2008 | Fukuda | ................ | B62M 9/1244 474/82 |
| 8,002,655 B2 * | 8/2011 | Meggiolan | ............. | B62M 25/08 403/349 |
| 8,882,618 B2 * | 11/2014 | Yamaguchi | ............ | B62M 25/08 474/82 |
| 8,900,078 B2 * | 12/2014 | Yamaguchi | ............ | B62M 9/122 474/82 |
| 8,974,331 B2 * | 3/2015 | Yamaguchi | ............ | B62M 25/08 474/82 |
| 11,319,020 B2 * | 5/2022 | Liao | ........................ | B62M 9/122 |
| 11,345,440 B2 * | 5/2022 | Jordan | ................... | B62M 9/132 |

(Continued)

*Primary Examiner* — Henry Y Liu
(74) *Attorney, Agent, or Firm* — Apex Juris, PLLC; Hilde Coeckx

(57) ABSTRACT

A rear derailleur of a bicycle includes a fixing portion having a first pivot portion and a second pivot portion, a linkage assembly including a first connecting shaft and a second connecting shaft, a moving portion, a chain guide assembly connected to the moving portion, and a driving assembly. An end of the first connecting shaft is pivotally connected to the first pivot portion via a first pivot. An end of the second connecting shaft is pivotally connected to the second pivot portion via a second pivot. The moving portion has a third pivot portion pivotally connected to the first connecting shaft via a third pivot and a fourth pivot portion pivotally connected to the second connecting shaft via a fourth pivot. The driving assembly is disposed on either the first connecting shaft or the second connecting shaft and drives one of the first to fourth pivots to drive the linkage assembly to pivot.

16 Claims, 28 Drawing Sheets

(56) References Cited

U.S. PATENT DOCUMENTS

| | | | | |
|---|---|---|---|---|
| 2004/0014541 A1* | 1/2004 | Dal Pra | B62M 25/08 | 474/70 |
| 2005/0187050 A1* | 8/2005 | Fukuda | B62M 25/08 | 474/82 |
| 2005/0199083 A1* | 9/2005 | Meggiolan | B62M 25/08 | 74/473.12 |
| 2005/0215369 A1* | 9/2005 | Fukuda | B62M 25/08 | 474/70 |
| 2006/0100045 A1* | 5/2006 | Fukuda | B62M 25/08 | 474/70 |
| 2006/0105869 A1* | 5/2006 | Fukuda | B62M 9/125 | 474/82 |
| 2006/0183584 A1* | 8/2006 | Fukuda | B62M 25/08 | 474/70 |
| 2008/0227572 A1* | 9/2008 | Sakaue | B62M 9/122 | 474/82 |
| 2009/0209375 A1* | 8/2009 | Takamoto | B62M 25/08 | 474/18 |
| 2014/0087901 A1* | 3/2014 | Shipman | B62M 9/122 | 429/100 |
| 2014/0243129 A1* | 8/2014 | Pasqua | B62M 9/1248 | 474/82 |
| 2014/0243130 A1* | 8/2014 | Pasqua | B62M 9/125 | 474/82 |
| 2015/0111675 A1* | 4/2015 | Shipman | B62M 25/08 | 474/82 |
| 2016/0107723 A1* | 4/2016 | Tsai | B62M 9/124 | 474/69 |
| 2017/0066501 A1* | 3/2017 | Hilgenberg | B62M 25/08 | |
| 2018/0281899 A1* | 10/2018 | Bernardele | B62M 9/124 | |
| 2019/0023351 A1* | 1/2019 | Tsai | B62M 9/122 | |
| 2019/0100279 A1* | 4/2019 | Brown | B62M 9/127 | |
| 2019/0100280 A1* | 4/2019 | Brown | B62M 1/36 | |
| 2019/0300111 A1* | 10/2019 | Liao | B62M 9/125 | |
| 2019/0300112 A1* | 10/2019 | Liao | B62M 9/125 | |
| 2019/0315435 A1* | 10/2019 | Jordan | B62L 3/02 | |
| 2019/0351971 A1* | 11/2019 | Dueweling | B62M 9/123 | |
| 2020/0166089 A1* | 5/2020 | Choltco-Devlin | F16D 27/09 | |
| 2020/0231249 A1* | 7/2020 | Ho | B62K 23/06 | |
| 2020/0247504 A1* | 8/2020 | Ho | B62M 25/08 | |
| 2020/0269954 A1* | 8/2020 | Mizutani | B62M 9/128 | |
| 2020/0346714 A1* | 11/2020 | Hahn | B62M 9/132 | |
| 2021/0188393 A1* | 6/2021 | Hahn | B62M 9/123 | |
| 2021/0387696 A1* | 12/2021 | Sala | B62M 9/122 | |

\* cited by examiner

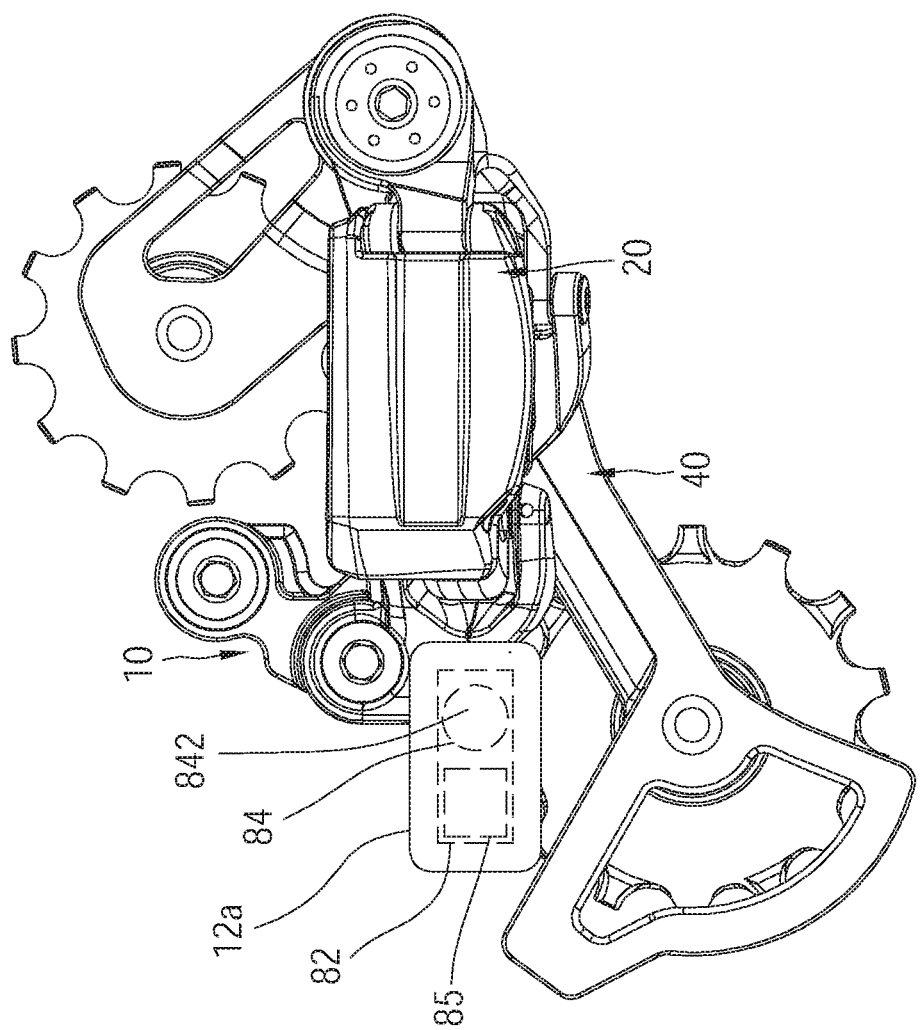

REAR DERAILEUR OF BICYCLE

BACKGROUND OF THE INVENTION

Technical Field

The present disclosure is related to a derailleur of a bicycle, and more particularly to a rear derailleur of a bicycle.

Description of Related Art

With the prevalence of bicycle leisure activities, bicycles are not simply commuting tools, but have become tools for leisure sports. The manufacturing technology of bicycles has been continuously improved for improving the performance of bicycles, wherein the derailleur is one of the main reasons affecting the speed of riding. Taking rear derailleur as an example, a rear derailleur includes a moving frame and a derailleur arm, wherein the moving frame is connected to a frame of a bicycle and uses a four-bar linkage. The derailleur arm is connected to the moving frame. By moving the moving frame to drive the derailleur arm to move to change a relative position between a chain and sprockets, thereby to achieve the purpose of shifting gears, enabling the rider to shift gears depending on road conditions and improve riding speed.

A conventional rear derailleur uses a cable to towed the moving frame to drive the derailleur arm to move. In recent years, an electronic rear derailleur has appeared on the market, wherein the electronic rear derailleur uses a motor as a drive, and uses a gear set to transmit the power of the motor to an output shaft, thereby to rotate the output shaft to move the moving frame. The electronic rear derailleur has the advantage of improving shift efficiency, making shifting faster and more convenient. However, the following disadvantages still exist.

1) A moving frame of the electronic rear derailleur is located on an outside of the frame of the bicycle, so that when the moving frame is hit by an external force, the gear set or the motor may be damaged due to the moving frame being moved in an excessive force, causing the gear cannot be shifted.

2) The motor and the gear set of the electronic rear derailleur are disposed on an outside of the moving frame, which makes the overall size of the electronic rear derailleur too large.

3) Since the electronic rear derailleur is powered by the motor and the motor needs to be powered by an external battery, a battery is installed on the frame of the bicycle (e.g. near the seat tube), and then is connected to the motor of the electronic rear derailleur via a power cord for providing an electrical energy required for the motor. However, the position of the battery is spaced from the position of electronic rear derailleur by a quite distance, so that the layout of the power cord will cause inconvenience during a process of assembling.

4) In order to achieve the purpose of reusing batteries, the battery is also designed with a rechargeable battery, wherein a charging interface is provided on the rechargeable battery. The external power is supplied into the charging interface with a charging cable to charge the rechargeable battery. Since the bicycle is used outdoors, sand or water may enter the charging interface, resulting in poor contact or damage to the charging interface.

Therefore, the conventional electrical rear derailleur still has room for improvements.

In addition, whether it is an electronic rear derailleur or a traditional rear derailleur towed by a steel cable, the moving frame is provided with a pivot shaft (p-knuckle) connected to the derailleur arm, and a torsional spring is provided on the pivot shaft, wherein the torsional spring provides torque to the pivot shaft, thereby the derailleur arm can provide a certain tension of the chain, so that the chain and the sprocket can mesh with each other during general riding or shifting. However, when the rider encounters poor road conditions, such as uneven road surfaces, the derailleur arm may excessively shake or vibrate, which will affect the engagement between the chain and the sprocket or cause a chain drop; or when the derailleur arm is pulled by an external force, after the external force is released, the torque of the torsional spring drives the derailleur arm to rebound rapidly, which will also cause the derailleur arm to excessively shake or vibrate, affecting the engagement between the chain and the sprocket or cause a chain drop.

Therefore, the conventional pivot shaft of the rear derailleur still has room for improvements.

BRIEF SUMMARY OF THE INVENTION

In view of the above, the purpose of the present disclosure is to provide a rear derailleur of a bicycle, which could effectively solve the aforementioned problems.

The inventive subject matter provides a rear derailleur of a bicycle including a fixing portion, a linkage assembly, a moving portion, a chain guide assembly, and a driving assembly, wherein the fixing portion is adapted to be connected to a frame of the bicycle. The linkage assembly is pivotally connected to the fixing portion. The moving portion is pivotally connected to the linkage assembly. The chain guide assembly is connected to the moving portion. The driving assembly includes a motor, a driving gear assembly, and a clutch assembly, wherein the motor includes an output shaft adapted to drive the driving gear assembly. The driving gear assembly is connected to the clutch assembly, so that the output shaft of the motor drives the linkage assembly to pivot via the driving gear assembly and the clutch assembly, thereby to drive the moving portion and the chain guide assembly to move. The clutch assembly is pivotally connected between the fixing portion and the linkage assembly and includes a first clutch member and a second clutch member which is abutted against the first clutch member in an axial direction of the clutch assembly. The first clutch member has a plurality of first clutch teeth extending toward the second clutch member; the second clutch member has a plurality of second clutch teeth extending toward the first clutch member. The second clutch teeth are meshed with the first clutch teeth. When a relative rotational torque between the first clutch member and the second clutch member is greater than a predetermined resistance, the first clutch teeth and the second clutch teeth shift relatively.

With the aforementioned design, the clutch assembly could engage and disengage power transmission when the linkage assembly is hit by an external force, thereby to prevent the driving gear assembly or the output shaft of the motor from damaging. In addition, when the moving portion is blocked or is get stuck, the clutch assembly could engage and disengage power transmission for preventing the motor from overheating.

In addition, the another primary objective of the present disclosure is to provide a rear derailleur of a bicycle including a fixing portion, a linkage assembly, a moving portion, a chain guide assembly, and a driving assembly, wherein the fixing portion is adapted to be connected to a frame of the bicycle and has a first pivot portion and a second pivot portion. The linkage assembly includes a first connecting shaft and a second connecting shaft, wherein an end of the first connecting shaft is pivotally connected to the first pivot portion via a first pivot, and an end of the second connecting shaft is pivotally connected to the second pivot portion via a second pivot. The moving portion has a third pivot portion and a fourth pivot portion, wherein the third pivot portion is pivotally connected to the first connecting shaft via a third pivot, and the fourth pivot portion is pivotally connected to the second connecting shaft via a fourth pivot. The chain guide assembly is connected to the moving portion. The driving assembly is disposed on one of the first connecting shaft and the second connecting shaft, wherein the driving assembly includes a motor and a driving gear assembly. An output shaft of the motor is connected to the driving gear assembly. The driving gear assembly is adapted to drive one of the first pivot, the second pivot, the third pivot, and the fourth pivot to drive the linkage assembly to pivot, thereby to drive the moving portion and the chain guide assembly to move.

By disposing the driving assembly on the linkage assembly, the overall size of the rear derailleur could be reduced, improving the problem that the overall size of the conventional electronic rear derailleur is too large.

Moreover, the still another primary objective of the present disclosure is to provide a rear derailleur of a bicycle including a fixing portion, a linkage assembly, a moving portion, a chain guide assembly, and a driving assembly, wherein the fixing portion is adapted to be connected to a frame of the bicycle. The linkage assembly is pivotally connected to the fixing portion. The moving portion is pivotally connected to the linkage assembly. The chain guide assembly is connected to the moving portion. The driving assembly includes a motor and a driving gear assembly, wherein the motor includes an output shaft adapted to drive the driving gear assembly. The driving gear assembly is connected to the linkage assembly. The output shaft of the motor drives the linkage assembly to pivot via the driving gear assembly, thereby to drive the moving portion and the chain guide assembly to move. A pivot shaft and a detachable battery module are disposed on the moving portion, wherein the chain guide assembly is pivotally connected to the pivot shaft, and the detachable battery module is adapted to provide an electric power to the motor.

By disposing the battery module on the moving portion of the rear derailleur, the power supplying distance could be shortened, so that there is no need to provide the power cord from the frame of the bicycle to the rear derailleur, simplifying the layout of the power cord.

Furthermore, the still another primary objective of the present disclosure is to provide a rear derailleur of a bicycle including a fixing portion, a linkage assembly, a moving portion, a chain guide assembly, a driving assembly, at least one rechargeable battery a coil, and a wireless charging circuit, wherein the fixing portion is adapted to be connected to a frame of the bicycle. The linkage assembly is pivotally connected to the fixing portion. The moving portion is pivotally connected to the linkage assembly. The chain guide assembly is connected to the moving portion. The driving assembly includes a motor and a driving gear assembly, wherein the motor includes an output shaft adapted to drive the driving gear assembly. The driving gear assembly is connected to the linkage assembly. The output shaft of the motor drives the linkage assembly to pivot via the driving gear assembly, thereby to drive the moving portion and the chain guide assembly to move. The rechargeable battery is adapted to provide an electrical energy required for the motor. The coil is adapted to receive an external charging power and is disposed on one of the fixing portion, the moving portion, and the linkage assembly. The wireless charging circuit is electrically connected to the coil and the rechargeable battery and is adapted to receive an electric power of the coil for charging the rechargeable battery.

By disposing the coil for inductive charging on the components of the rear derailleur, the rechargeable battery of the rear derailleur could be charged more conveniently, without the need to set a charging interface on the battery module.

Furthermore, the still another primary objective of the present disclosure is to provide a rear derailleur of a bicycle including a fixing portion, a linkage assembly, a moving portion, a chain guide assembly, and a driving assembly, wherein the fixing portion is adapted to be connected to a frame of the bicycle. The linkage assembly is pivotally connected to the fixing portion. The moving portion is pivotally connected to the linkage assembly. The chain guide assembly is connected to the moving portion. The driving assembly is connected to the linkage assembly and is adapted to drive the linkage assembly to pivot, thereby to drive the moving portion and the chain guide assembly to move. The moving portion includes a housing, a pivot shaft, and a damping member, wherein the housing has a receiving space. The pivot shaft is disposed in the receiving space and is connected to the chain guide assembly. The damping member is disposed between the pivot shaft and an inner wall of the receiving space, and has an outer abutted surface abutting against the inner wall of the receiving space.

With the damping member that could provide a damping effect, the swinging speed of the chain guide assembly could be slowed down, thereby to prevent the chain guide assembly from excessive shaking or vibrating, which may cause the chain to jump and affect the engagement between the chain and the sprocket or cause a chain drop.

BRIEF DESCRIPTION OF THE SEVERAL VIEWS OF THE DRAWINGS

The present disclosure will be best understood by referring to the following detailed description of some illustrative embodiments in conjunction with the accompanying drawings, in which

FIG. 28 is a side view of the rear derailleur according to still another embodiment of the present disclosure.

DETAILED DESCRIPTION OF THE INVENTION

Figure 1:
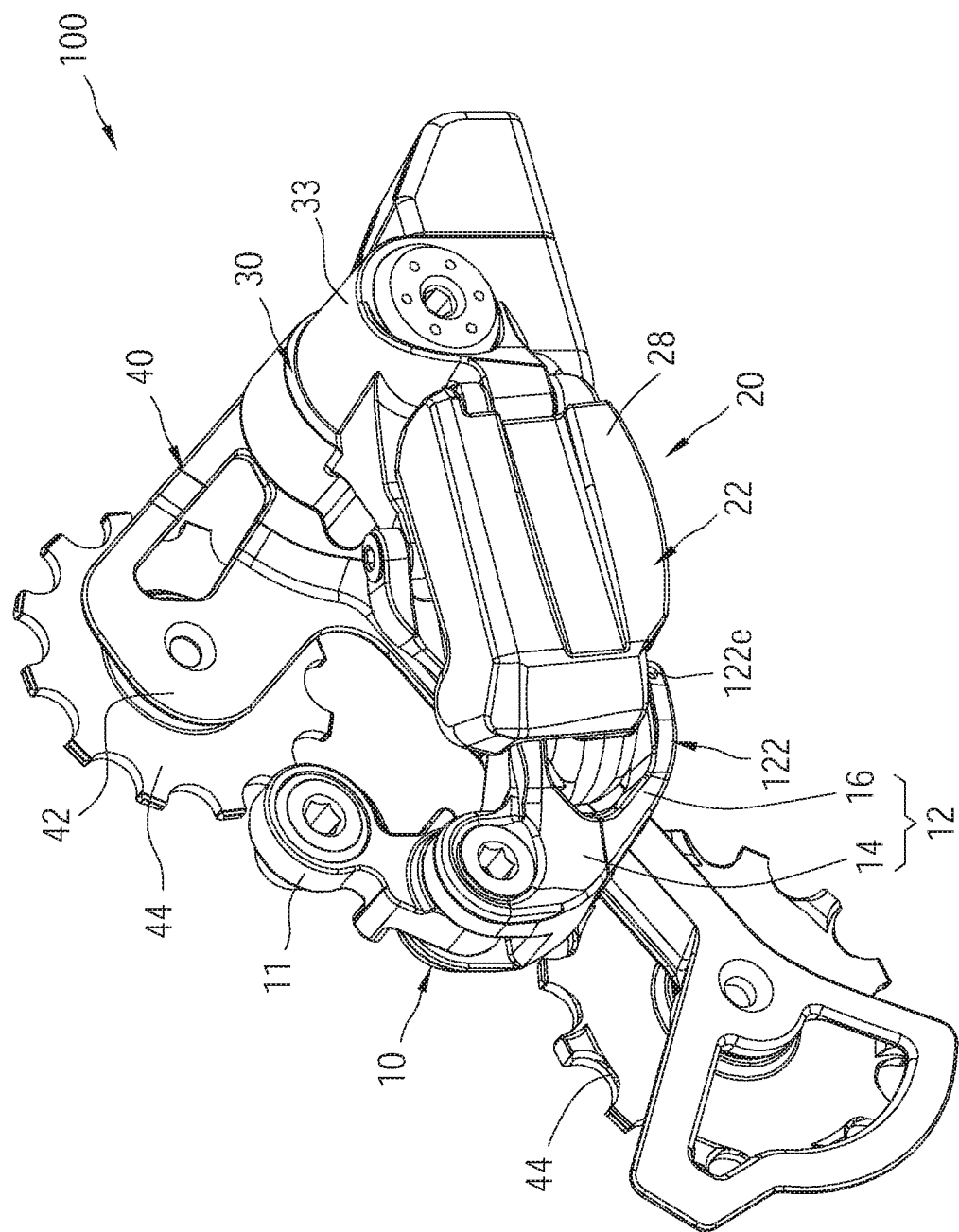
FIG. 1 is a perspective view of the rear derailleur according to an embodiment of the present disclosure.
Figure 2:
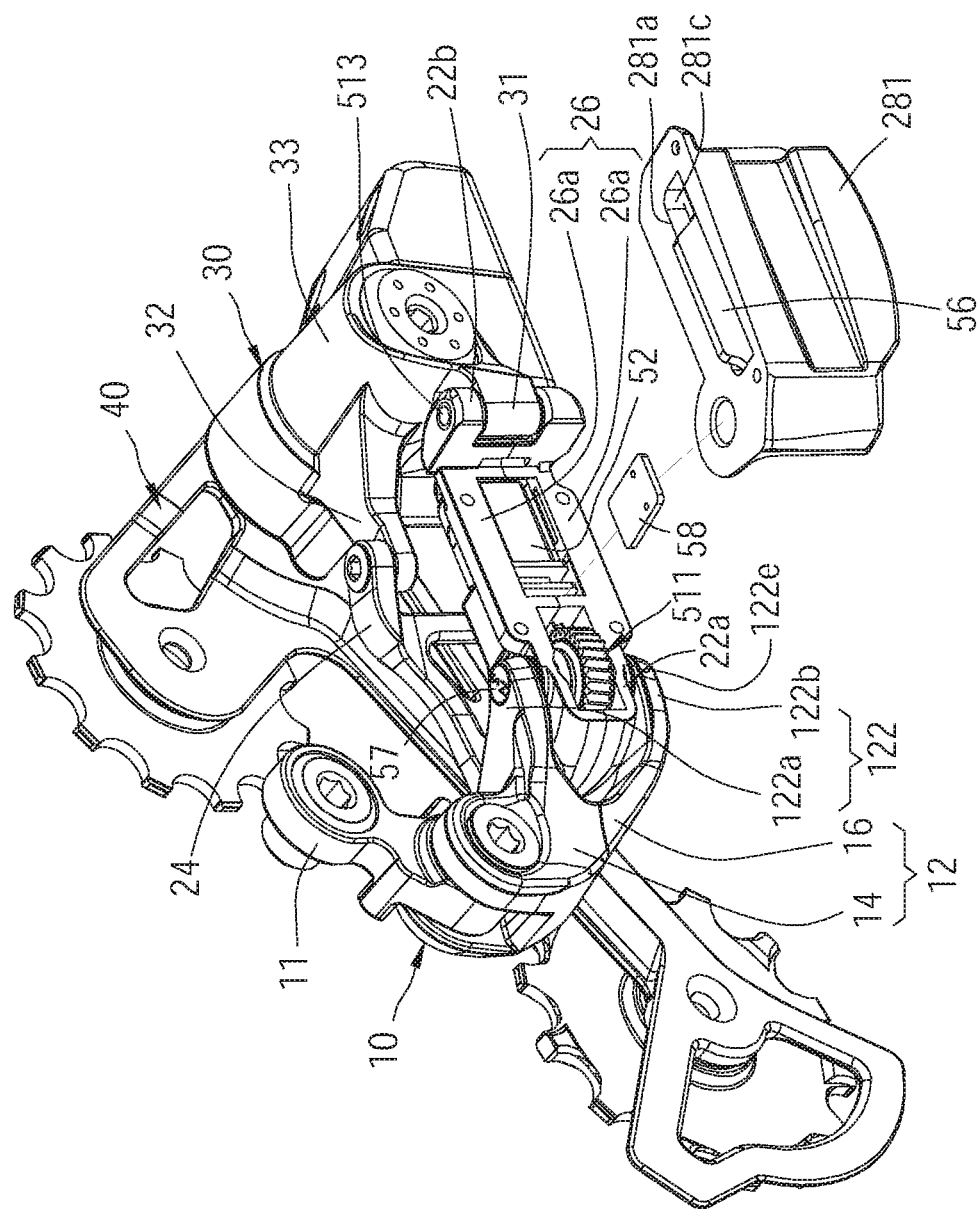
FIG. 2 is a partially exploded view of the rear derailleur according to the embodiment of the present disclosure.
Figure 3:
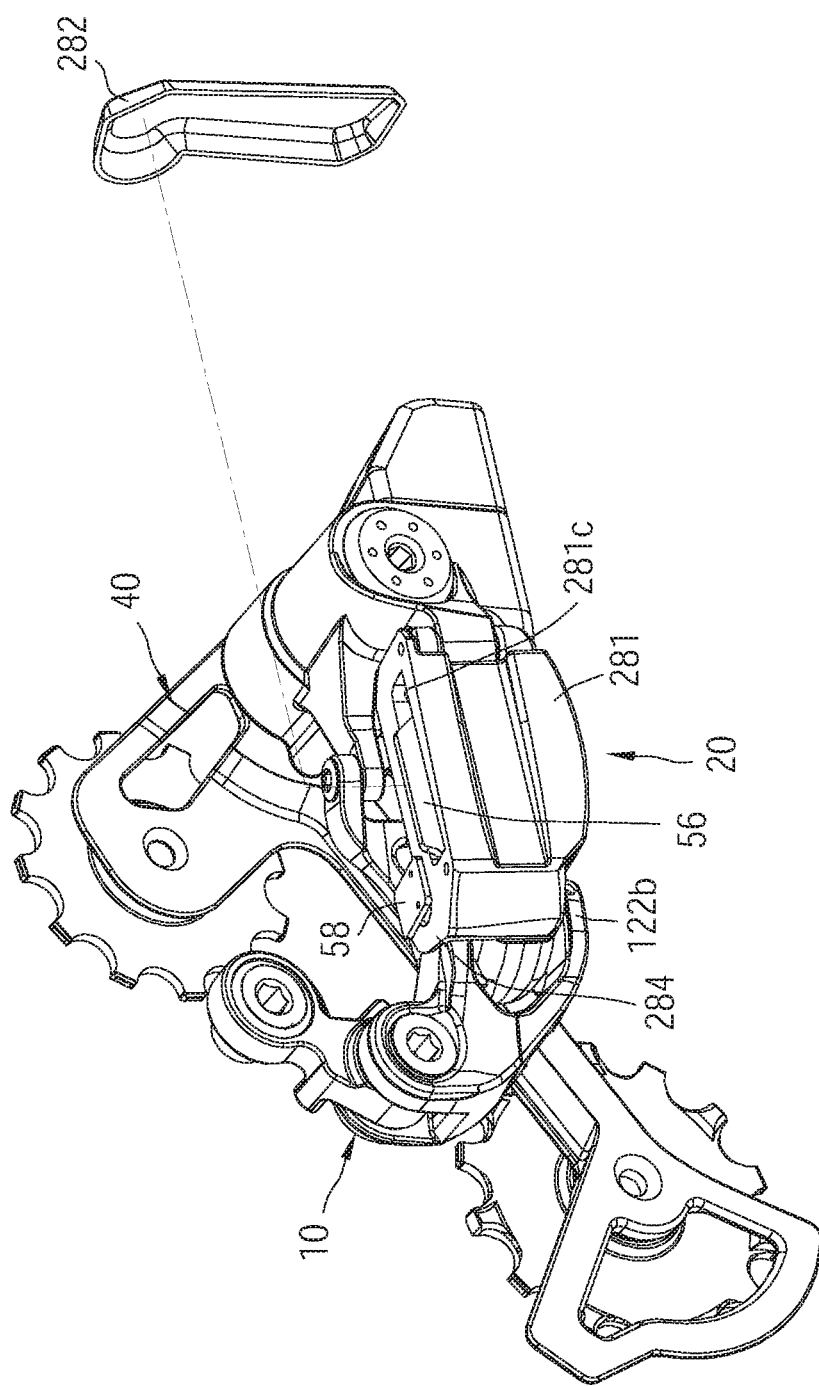
FIG. 3 is a partially exploded view of the rear derailleur according to the embodiment of the present disclosure.

A rear derailleur 100 of a bicycle according to an embodiment of the present disclosure is illustrated in FIG. 1 to FIG. 20, and includes a fixing portion 10, a linkage assembly 20, a moving portion 30, a chain guide assembly 40, and a driving assembly 50.

The fixing portion 10 is configured to be connected to a frame (not shown) of the bicycle and is disposed on an outside of a rear sprocket assembly of the bicycle. An end of the linkage assembly 20 is pivotally connected to the fixing portion 10, and another end of the linkage assembly 20 is pivotally connected to the moving portion 30. The chain guide assembly 40 is connected to the moving portion 30 and includes a cage plate 42 and two guiding wheels 44.

The fixing portion 10 includes a connecting member 11 and a base 12, wherein an end of the connecting member 11 is pivotally connected to the base 12, and another end of the connecting member 11 is fixed on the frame of the bicycle. The base 12 has a first pivot portion 122 and a second pivot portion 124, wherein the first pivot portion 122 and the second pivot portion 124 are respectively and pivotally connected to the linkage assembly 20. In the current embodiment, the first pivot portion 122 has two opposite first pivot ends 122a, 122b, and the second pivot portion 124 has two opposite second pivot ends 124a and is located between the first pivot portion 122 and the chain guide assembly 40, wherein the first pivot portion 122 is closer to an outside of the fixing portion 10 which is away from the chain guide assembly 40 than the second pivot portion 124. However, the arrangement of the first pivot portion 122 and the second pivot portion 124 is not a limitation of the present disclosure. In other embodiments, the first pivot portion 122 could be disposed between the second pivot portion 124 and the chain guide assembly 40, wherein the second pivot portion 124 is closer to the outside of the fixing portion 10 than the first pivot portion 122.

More specifically, the base 12 includes a first body 14 and a second body 16, wherein the second body 16 is detachably connected to a bottom portion of the first body 14. In the current embodiment, one of the first pivot ends (i.e., the first pivot end 122a, hereafter the first pivot end 122a) of the first pivot portion 122 and the second pivot ends 124a of the second pivot portion 124 are disposed on the first body 14, and the other first pivot end 122b (hereafter the first pivot end 122b) of the first pivot portion 122 is disposed on the second body 16.

The moving portion 30 has a third pivot portion 31 and a fourth pivot portion 32, wherein the third pivot portion 31 and the fourth pivot portion 32 are respectively and pivotally connected to the linkage assembly 20. In the current embodiment, the fourth pivot portion 32 is, but not limited to, located between the third pivot portion 31 and the chain guide assembly 40, wherein the third pivot portion 31 is closer to the outside of the fixing portion 10 than the fourth pivot portion 32. In other embodiments, the third pivot portion 31 could be disposed between the fourth pivot portion 32 and the chain guide assembly 40, wherein the fourth pivot portion 32 is closer to the outside of the fixing portion 10 than the third pivot portion 31.

The linkage assembly 20 includes a first connecting shaft 22 and a second connecting shaft 24, wherein the second connecting shaft 24 is located between the first connecting shaft 22 and the chain guide assembly 40. An end portion 22a of the first connecting shaft 22 is pivotally connected to the first pivot portion 122 of the fixing portion 10 via a first pivot 511, thereby to dispose the end portion 22a of the first connecting shaft 22 between the first pivot ends 122a, 122b. In other words, the first pivot 511 is disposed between the fixing portion 10 and the linkage assembly 20. Another end portion 22b of the first connecting shaft 22 is pivotally connected to the third pivot portion 31 of the moving portion 30 via a third pivot 513.

Figure 4:
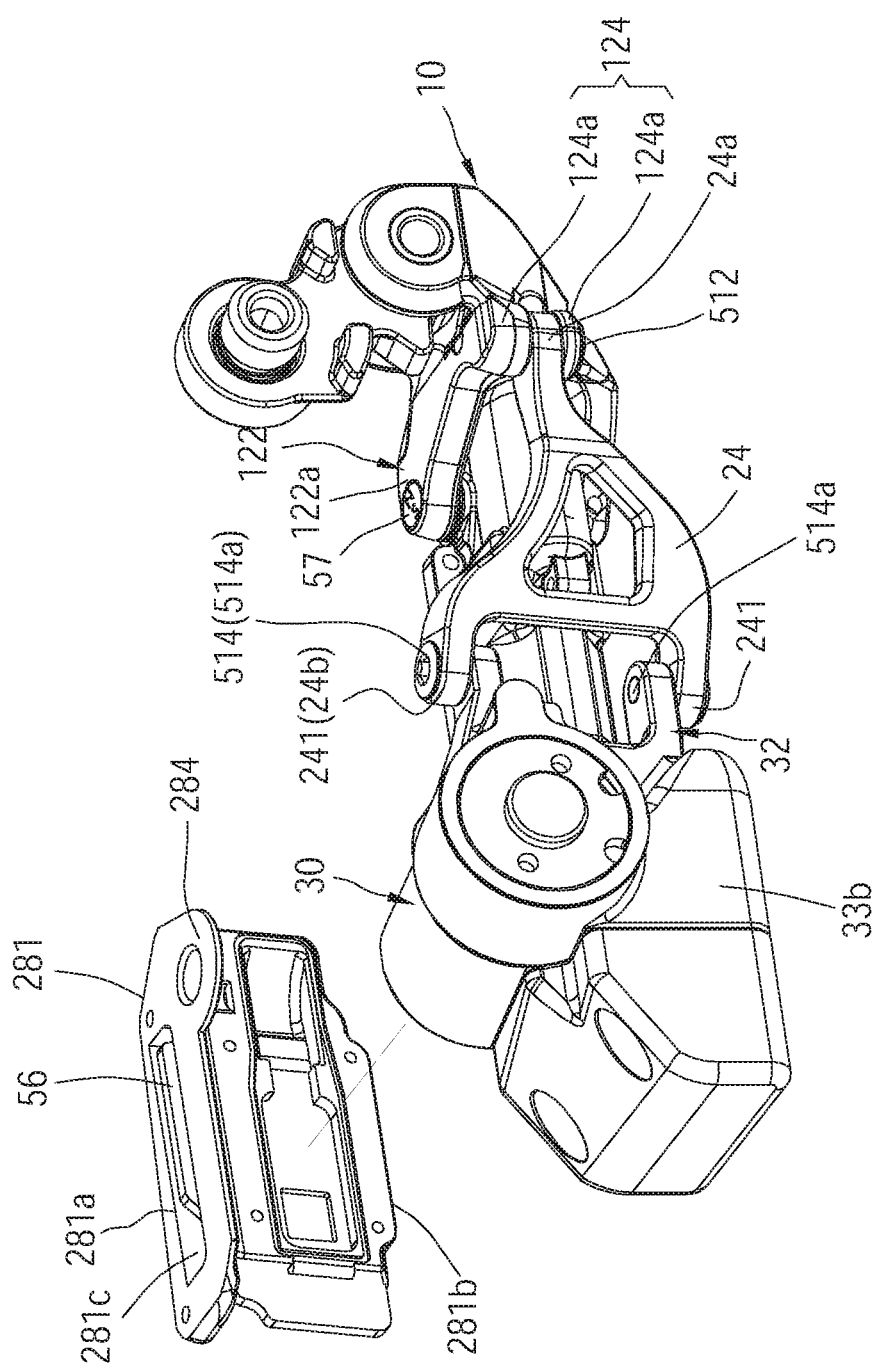
FIG. 4 is a partially exploded view of the rear derailleur according to the embodiment of the present disclosure.
Figure 5:
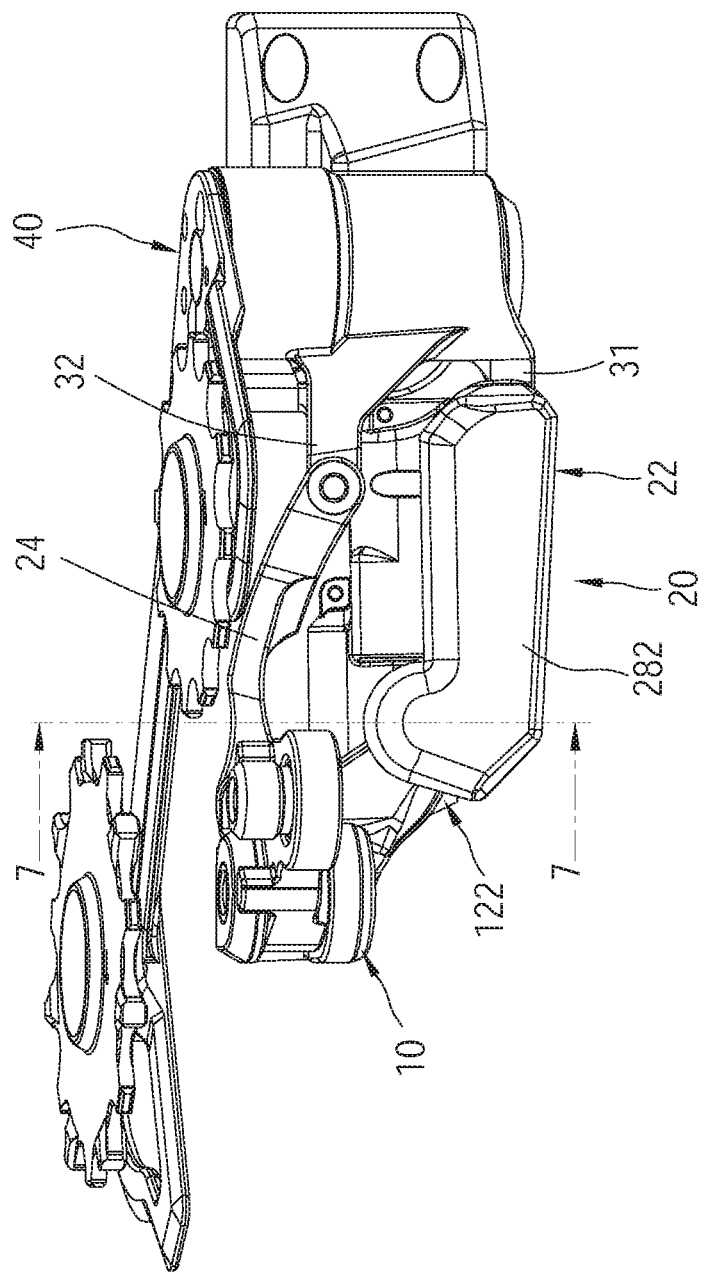
FIG. 5 is a top view of the rear derailleur according to the embodiment of the present disclosure.
Figure 6:
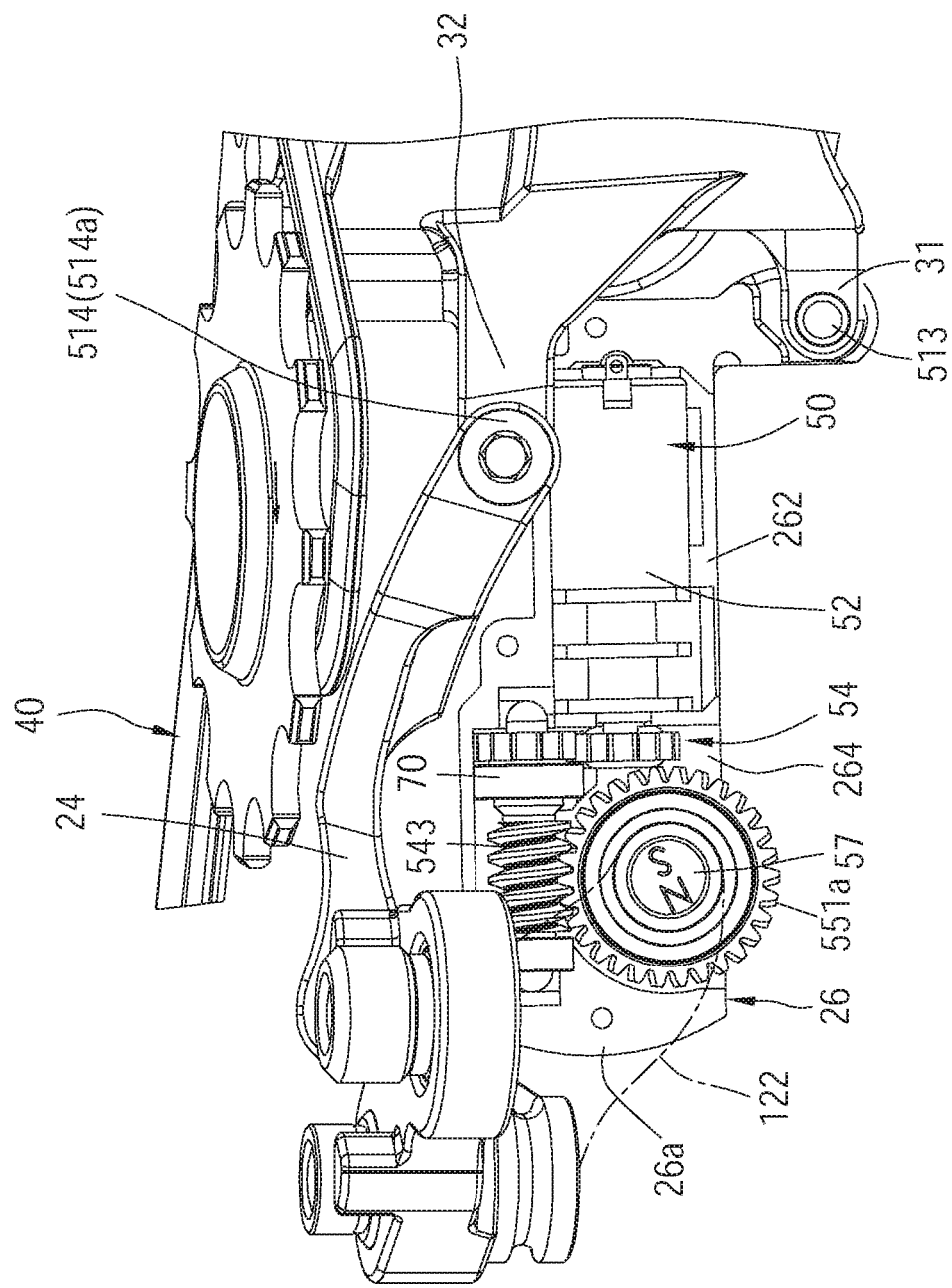
FIG. 6 is a schematic view, showing a part of the linkage assembly of the rear derailleur according to the embodiment of the present disclosure.
Figure 7:
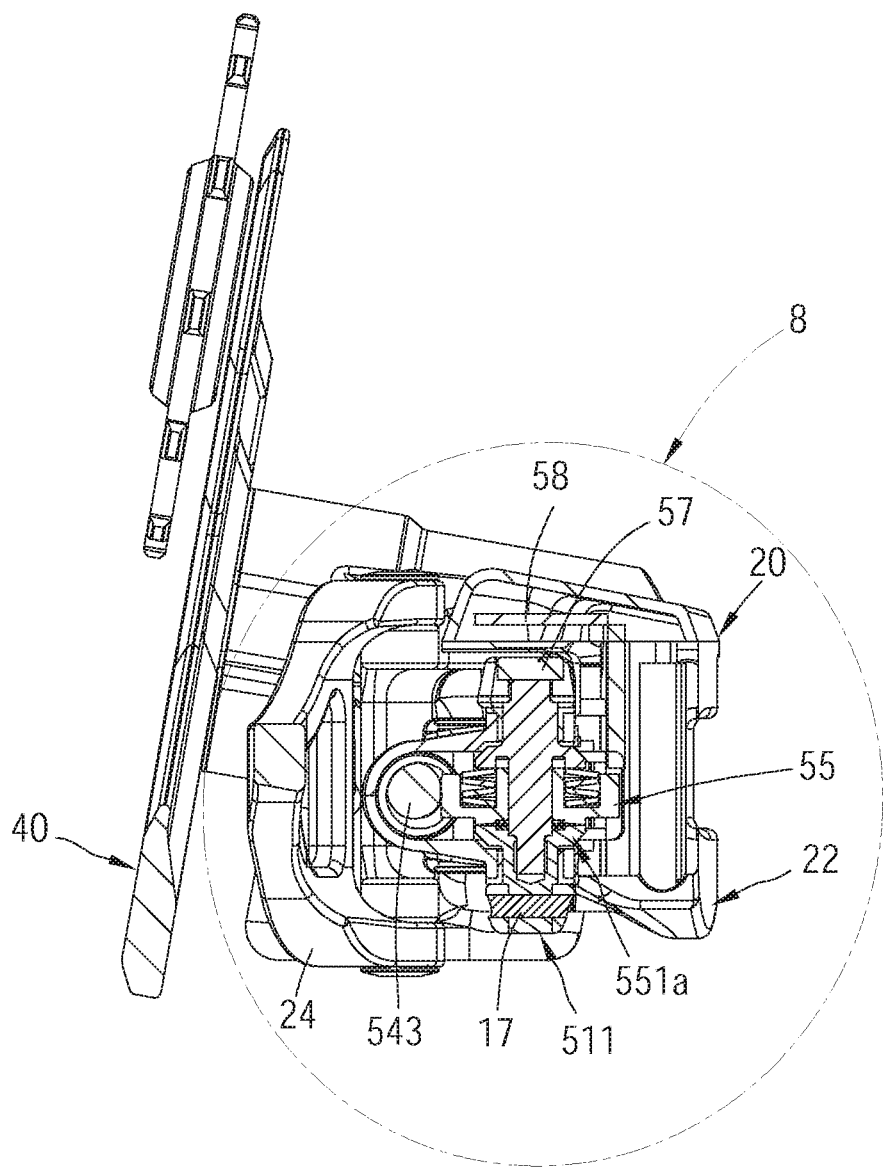
FIG. 7 is a sectional view along the 7-7 line in FIG. 5.

As shown in FIG. 4, an end portion 24a of the second connecting shaft 24 is pivotally connected to the second pivot portion 124 of the fixing portion 10 via a second pivot 512, thereby to dispose the end portion 24a of the second connecting shaft 24 between the second pivot ends 124a of the second pivot portion 124. Another end portion 24b of the second connecting shaft 24 extends toward the moving portion 30 to form two opposite pivot ends 241, so that the second connecting shaft 24 is substantially Y-shaped, wherein the two pivot ends 241 are pivotally connected to the fourth pivot portion 32 of the moving portion 30 via a fourth pivot 514. In the current embodiment, the fourth pivot 514 includes two individual pivot shafts disposed on a same pivot axis.

As shown in FIG. 6 to FIG. 9, the driving assembly 50 includes a motor 52, a driving gear assembly 54, and a circuit board 56, wherein an output shaft 521 of the motor 52 is connected to the driving gear assembly 54. The driving gear assembly 54 is connected to the linkage assembly 20. The circuit board 56 is electrically connected to the motor 52 and is adapted to receive a wired or wireless control signal for controlling gear shifting and to control the motor 52 according to the control signal. When the output shaft 521 of the motor 52 rotates, a rotation of the output shaft 521 is transmitted by the driving gear assembly 54 to drive the linkage assembly 20 to pivot, thereby to drive the moving portion 30 and the chain guide assembly 40 to move, achieving a purpose of gear shifting.

The driving assembly 50 could be disposed on the first connecting shaft 22 of the linkage assembly 20, and the driving gear assembly 54 is connected to either the first pivot 511 or the third pivot 513 and correspondingly generates a rotating force to the first pivot 511 or the third pivot 513, thereby to drive the first connecting shaft 22 which provides with the driving assembly 50 to shift to make the linkage assembly 20 pivots. Alternatively, the driving assembly 50 could be disposed on the second connecting shaft 24 of the linkage assembly 20, and the driving gear assembly 54 is connected to either the second pivot 512 or the fourth pivot 514 and correspondingly generates a rotating force to the second pivot 512 or the fourth pivot 514, thereby to drive the second connecting shaft 24 which provides with the driving assembly 50 to shift to make the linkage assembly 20 pivots.

In the current embodiment, the driving assembly 50 is disposed on the first connecting shaft 22 as an example, and the driving assembly 50 is connected to the first pivot 511. In the current embodiment, the first connecting shaft 22 includes a motor bracket 26 and a case 28, wherein the case 28 is engaged with the motor bracket 26. An end of the motor bracket 26 is pivotally connected to the first pivot portion 122 of the fixing portion 10 via the first pivot 511, and another end of the motor bracket 26 is pivotally connected to the third pivot portion 31 of the moving portion 30 via the third pivot 513. The motor 52 and the driving gear assembly 54 are disposed in the motor bracket 26. In the current embodiment, the motor bracket 26 is formed by matching two half casings 26a with each other, wherein the motor bracket 26 has two receiving spaces 262, 264 therein, and the motor 52 and the driving gear assembly 54 are respectively disposed in the two receiving spaces 262, 264. In practice, the motor bracket 26 could have a merely single receiving space, and both of the motor 52 and the driving gear assembly 54 are disposed in the receiving space. In practice, the motor bracket 26 and the first connecting shaft 22 which provides with the first connecting shaft 22 could be integrally formed as a monolithic unit. In an embodiment that the motor bracket 26 is disposed on the second connecting shaft 22, the motor bracket 26 and the second connecting shaft 24 could be integrally formed as a monolithic unit.

Figure 8:
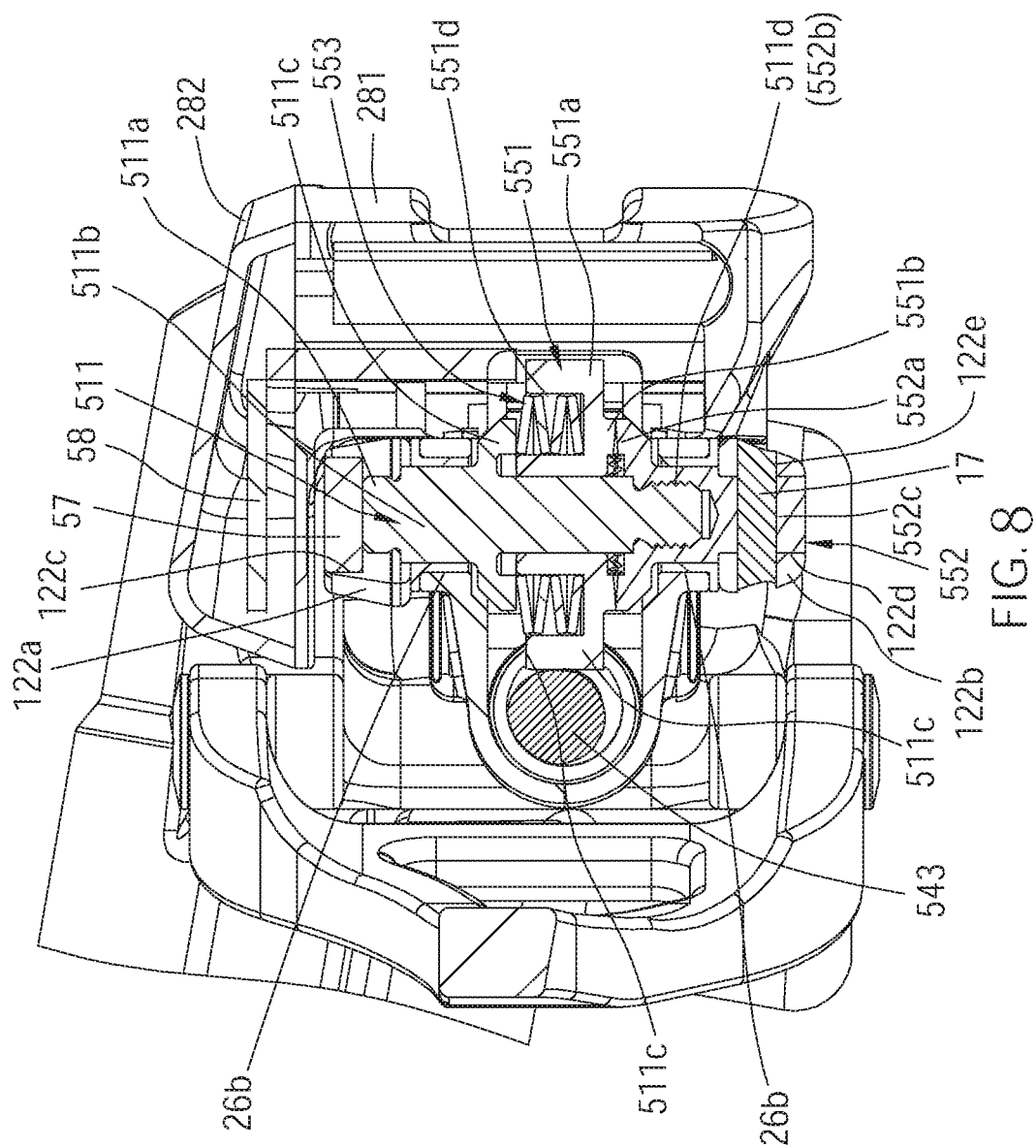
FIG. 8 is a partially enlarged view of FIG. 7.

As shown in FIG. 8, a counterbore 122c is provided on one of the first pivot ends (i.e., the first pivot end 122a) of the first pivot portion 122 of the fixing portion 10, and a through hole 122d is provided on the first pivot end 122b of the fixing portion 10, wherein the counterbore 122c and the through hole 122d are correspondingly disposed. In addition, referring to FIGS. 1, 2, 8, 11, a first positioning hole 122e which intersects with the through hole 122d is disposed at the first pivot end 122b of the fixing portion 10, and a second positioning hole 552d corresponding to the first positioning hole 122e is disposed at an end of the first pivot 511. Two perforations 26b corresponding to the counterbore 122c and the through hole 122d are disposed on one of the ends of the motor bracket 26. During a process of assembling, after the first pivot 511 passes through the through hole 122d of the fixing portion 10 and the perforations 26b of the motor bracket 26, a fixing member 17 passes through the first positioning hole 122e and the second positioning hole 552d, thereby to fix a relative position between the first positioning hole 122e and the second positioning hole 552d. In the current embodiment, the fixing member 17 is a pin. At least one end of the first pivot 511 is fixed to the first pivot portion 122 of the fixing portion 10, so that the first pivot 511 could not rotate relative to the fixing portion 10. For instance, an end of the first pivot 511 is fixed to the counterbore 122c, and another end of the first pivot 511 is disposed in the through hole 122d. In practice, a positioning hole could be disposed on the second pivot 512, the third pivot 513, or the fourth pivot 514 which is connected to the driving gear assembly 54, and a corresponding positioning hole could be disposed on the second pivot portion 124, the third pivot portion 31, or the fourth pivot portion 32 which is connected to the second pivot 512, the third pivot 513, or the fourth pivot 514 connected to the driving gear assembly 54, thereby to fix a relative position between the positioning hole and the corresponding positioning hole via the fixing member 17.

The driving gear assembly 54 includes a first gear 541, a second gear 542, and a worm shaft 543, wherein the first gear 541 fits around the output shaft 521 of the motor 52 and is meshed with the second gear 542. An end of the worm shaft 543 is fitted by the second gear 542, and another end of the worm shaft 543 is meshed with a clutch assembly 55. The clutch assembly 55 is disposed on the first pivot 511 to drive the motor bracket 26 to rotate relative to the first pivot 511, thereby to make the linkage assembly 20 to pivot and to drive the chain guide assembly 40 to move accordingly, so that a chain of the bicycle could be meshed with sprockets with different radiuses. In other words, the clutch assembly 55 is disposed at a part of the first connecting shaft 22. In other embodiments, the clutch assembly could be disposed on the third pivot 513 or the fourth pivot 514, wherein the first connecting shaft 22 or the second connecting shaft 24 which provides with the driving assembly 50 is pivotally connected to the third pivot portion 31 or the fourth pivot portion 32 of the moving portion 30 or the first pivot portion 122 or the second pivot portion 124 of the fixing portion 10 via the clutch assembly 55.

The driving assembly 50 includes a magnet 57 and a magnetic sensor 58, wherein the magnet 57 is disposed in the counterbore 122c of the first pivot portion 122 of the fixing portion 10 and is located at a first end 511a of the first pivot 511 which is away from the fixing member 17. In practice, the magnet 57 could be engaged with the first end 511a of the first pivot 511. The magnetic sensor 58 is disposed on the first connecting shaft 22 at where the magnet 57 corresponds to, without physically contacting the magnet 57, wherein a surface of the magnet 57 faces the magnetic sensor 58, and another surface of the magnet 57 faces the first pivot 511. In the current embodiment, the magnetic sensor 58 is disposed at a side of the magnet 57 opposite to the first pivot 511 and is electrically connected to the circuit board 56. The magnetic sensor 58 is adapted to detect a relative position between the magnet 57 and the first pivot 511 which provides with the driving assembly 50 and to provide a position signal to the circuit board 56 for performing a feedback control. In the current embodiment, the magnetic sensor 58 is a Hall sensor. In practice, if the driving assembly 50 is disposed on the second connecting shaft 24, the magnetic sensor 58 could be disposed on the second connecting shaft 24 which provides with the motor bracket 26. In other embodiments, the magnet 56 could be disposed on an end portion of one of ends of the second pivot 512, the third pivot 513, or the fourth pivot 514 which provides with the clutch assembly 55. Preferably, the magnet 56 is disposed away from the fixing member 17.

Figure 9:
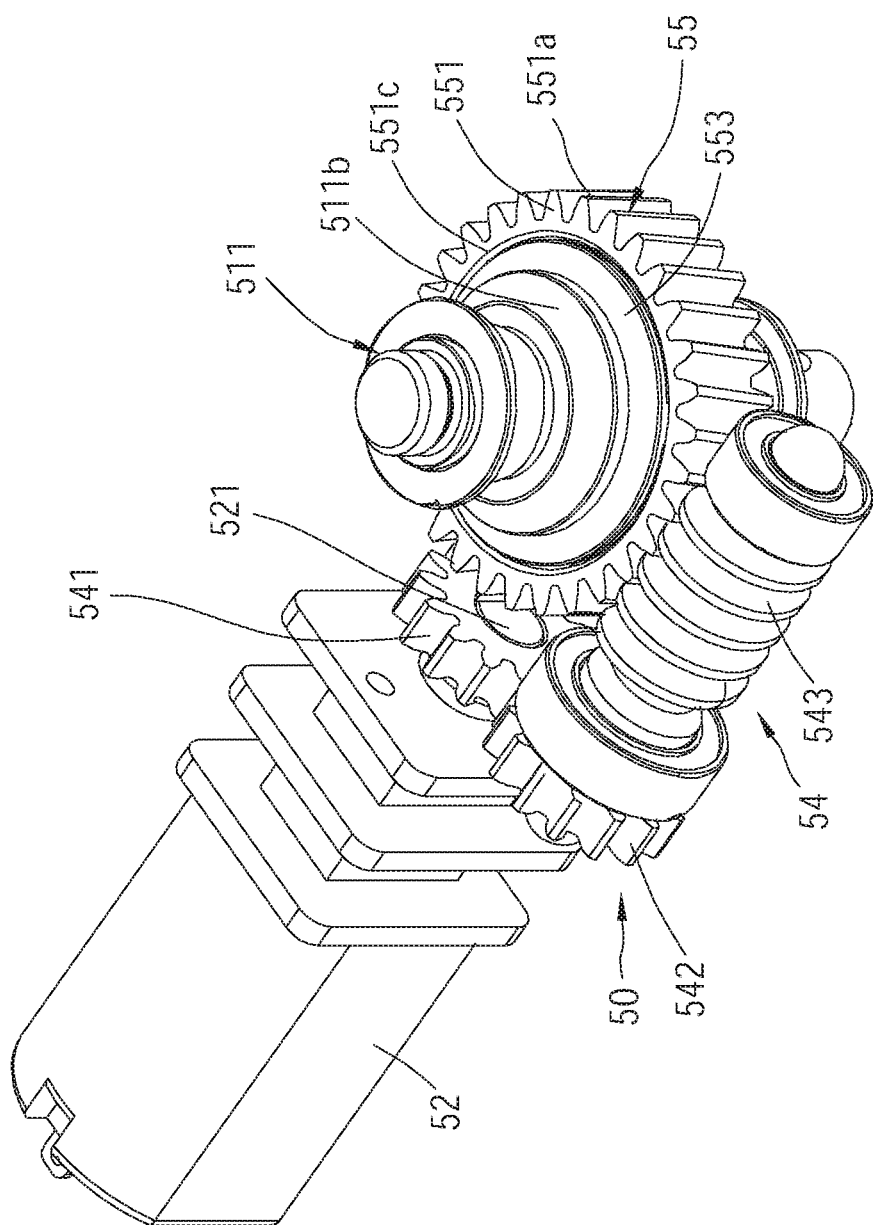
FIG. 9 is a perspective view, showing the motor, the driving gear assembly, and the first pivot of the rear derailleur according to the embodiment of the present disclosure.
Figure 10:
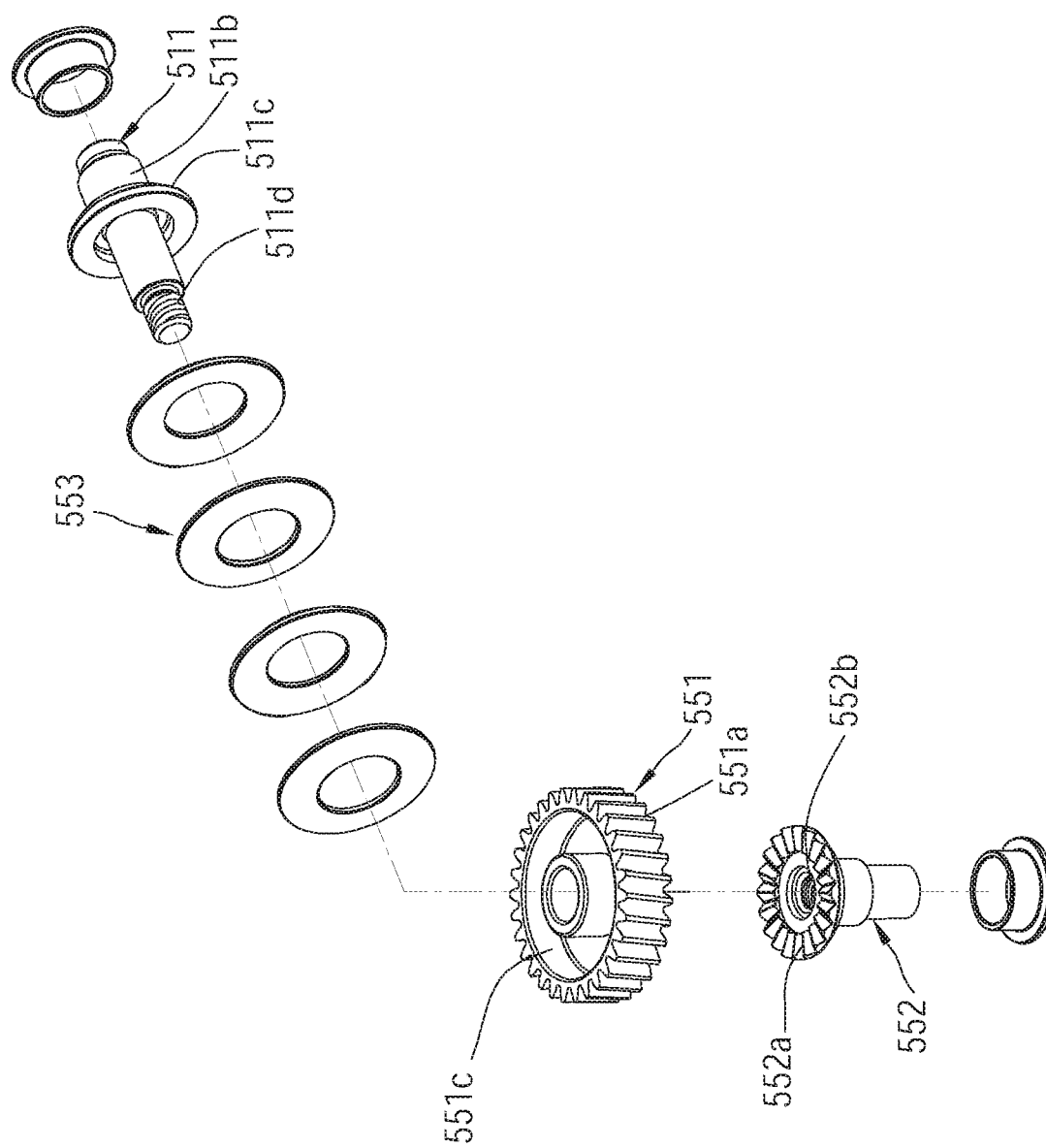
FIG. 10 is an exploded view of the first pivot according to the embodiment of the present disclosure.
Figure 11:
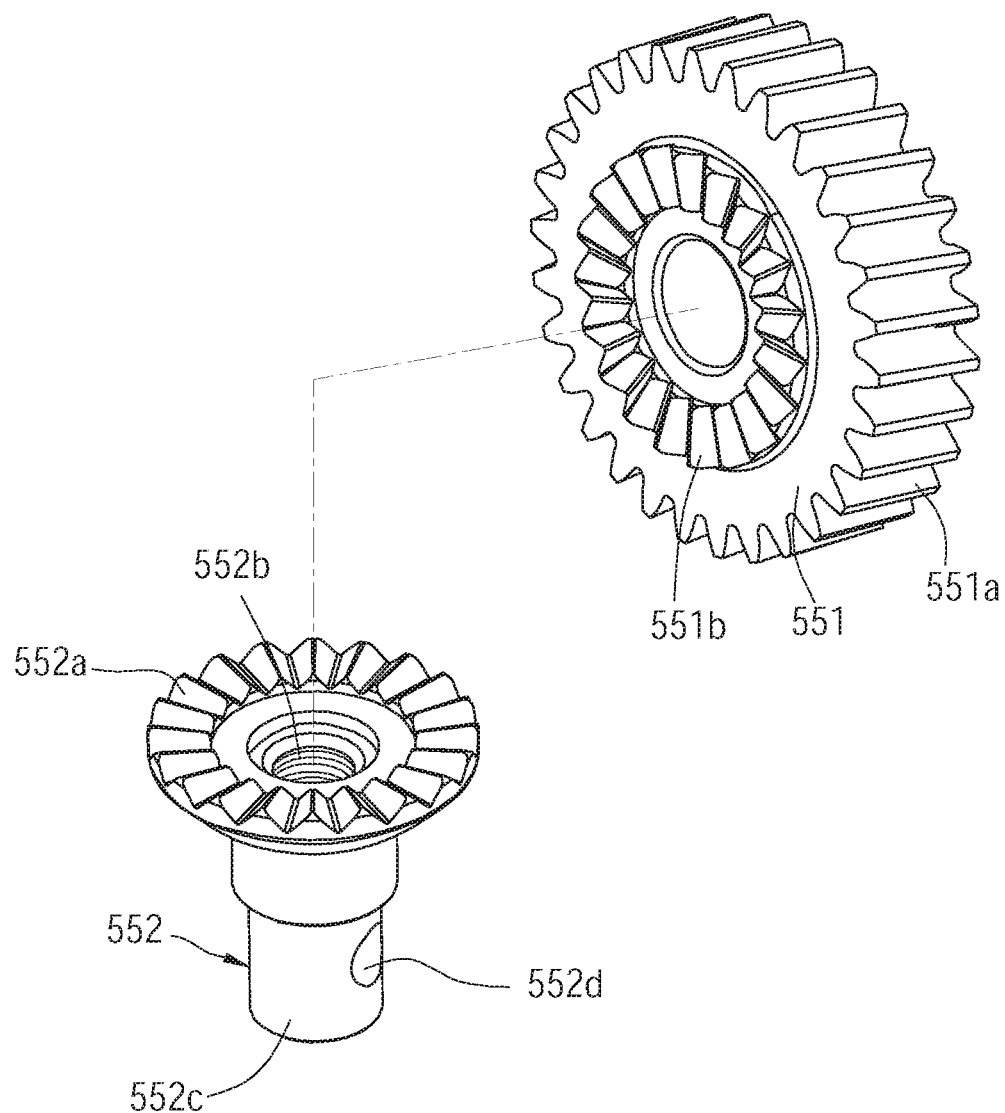
FIG. 11 is a partially exploded view of the first pivot according to the embodiment of the present disclosure.

As shown in FIG. 9 and FIG. 10, the output shaft 521 of the motor 52 is connected to the driving gear assembly 54, wherein the driving gear assembly 54 is meshed with the clutch assembly 55, and the clutch assembly 55 is disposed on the first pivot 511. When the output shaft 521 of the motor 52 rotates, the motor 52 generates a rotating force to the clutch assembly 55 via the first gear 541, the second gear 542, and the worm shaft 543 of the driving gear assembly 54, wherein the rotating force is transmitted to the first connecting shaft 22 via the first pivot 511 which is fixed, so that the first connecting shaft 22 pivots to make the linkage assembly 20 pivot accordingly, thereby to drive the moving portion 30 and the chain guide assembly 40 to move. When the first connecting shaft 22 pivots, the magnetic sensor 58 rotates relative to the magnet 57 at the same time, so that the magnetic sensor 58 could detect a variation of a relative position of the magnet 57, thereby to figure out a relative position of the chain guide assembly 40.

Referring to FIG. 1 to FIG. 4, the motor bracket 26 is engaged with the case 28 to form a receiving space therein, wherein the motor 52 and the driving gear assembly 54 are disposed in the receiving space, preventing the driving assembly 50 from being affected by moisture or dust. The case 28 is consisted by a case body 281 and a cover 282, wherein the case body 281 has a top surface 281a, a bottom surface 281b, and a receiving slot 281c recessing from the top surface 281a toward the bottom surface 281b and having an opening on the top surface 281a. The circuit board 56 is disposed in the receiving slot 281c. The top surface 281a of the case body 281 has an extending portion 284 extending toward the chain guide assembly 40 and covering the first pivot end 122a, wherein the extending portion 284 is located between the magnet 56 and the magnetic sensor 57, and the magnetic sensor 58 is located above the extending portion 284. A surface of the extending portion 284 faces the magnet 57, and another surface of the extending portion 284 faces the magnetic sensor 58, so that the magnetic sensor 58 is disposed on the case body 281 at where the magnet 57 corresponds to. The cover 282 is engaged with the case body 281 and covers the top surface 281a of the case body 281, the extending portion 284, the opening of the receiving slot 281c, and the magnetic sensor 58.

By disposing the driving assembly 50 in the linkage assembly 20, an overall size of the rear derailleur 100 could be reduced.

In order to prevent the driving gear assembly 54 or the output shaft 521 of the motor 52 from being damaged due to the linkage assembly 20 is hit by an external force or is blocked which may cause the motor 52 generates too much rotating force, the clutch assembly 55 of the driving assembly 50 includes a first clutch member 551 and a second clutch member 552 which is abutted against the first clutch member 551 in an axial direction of the clutch assembly 55, wherein the second clutch member 552 is meshed with the first clutch member 551, and both the second clutch member 552 and the first clutch member 551 fit around a shaft 511b of the first pivot 511. In the current embodiment, the shaft 511b is formed on the first pivot 511. When an external force is exerted on the second clutch member 552, the second clutch member 552 could be engaged and disengaged with the first clutch member 551 to achieve a clutch performance. Referring to FIG. 8 to FIG. 11, in the current embodiment, the first clutch member 551 has a plurality of gear teeth 551a extending in a radial direction of the first clutch member 551 and a plurality of first clutch teeth 551b extending in an axial direction of the first clutch member 551; the second clutch member 552 has a plurality of second clutch teeth 552a extending in an axial direction of the second clutch member 552, wherein the first clutch teeth 551b extends in a direction toward the second clutch member 552, and the second clutch teeth 552a extends in a direction toward the first clutch member 551. The first clutch member 551 is meshed with the worm shaft 543 via the gear teeth 551a and is meshed with the second clutch teeth 552a of the second clutch member 552 via the first clutch teeth 551b. In a normal state, the second clutch teeth 552a is meshed with the first clutch teeth 551b without relative movement. When an external force or a rotating force which is greater than a predetermined resistance is exerted on the driving assembly 50 (i.e., when a relative rotational torque between the first clutch member 551 and the second clutch member 552 is greater than the predetermined resistance), the first clutch teeth 551b and the second clutch teeth 552a shift relatively to release a resistance and to mesh with each other again.

For example, when the linkage assembly 20 is hit by an external force and a rotational force of the first clutch member 551 is greater than the predetermined resistance, the first clutch teeth 551b and the second clutch teeth 552a slide relatively to prevent the driving assembly 50 from being damaged. In addition, when a movement of the moving portion 30 is blocked, the first clutch teeth 551b and the second clutch teeth 552a slide relatively to prevent the motor 52 from overheating.

Referring to FIG. 9 and FIG. 10, the clutch assembly 55 further includes an elastic member 553 disposed on a sustained portion 551c of the first clutch member 551, wherein the sustained portion 551c and the first clutch teeth 551b face opposite directions. In the current embodiment, the sustained portion 551c has an annular groove 551d, wherein the elastic member 553 is disposed in the annular groove 551d. During a process of assembling, the elastic member 553, the first clutch member 551, and the second clutch member 552 sequentially fit around the first pivot 511, wherein an end of the elastic member 553 abuts against a bottom of the annular groove 551d, and another end of the elastic member 553 abuts against an extending section 511c extending in a radial direction of the shaft 511b of the first pivot 511. The extending section 511c is received in the annular groove 551d. In the current embodiment, the elastic member 553 is a plurality of belleville springs disposed between the extending section 511c and the annular groove 551d of the first clutch member 551 for providing an adjustable pushing force. When the extending section 511c is disposed at a position away from the bottom of the annular groove 551d, a threshold force for making the first clutch member 551 and the second clutch member 552 shift relatively is smaller (i.e., the predetermined resistance is smaller); when the extending section 511c is disposed at a position close to the bottom of the annular groove 551d, the threshold force for making the first clutch member 551 and the second clutch member 552 shift relatively is greater, so that a user could adjust the threshold force for making the first clutch member 551 and the second clutch member 552 shift relatively to meet various requirements.

The shaft 511b of the first pivot 511 has a threaded section 511d on an end opposite to the first end 511a, and the second clutch member 552 has a threaded hole 552b located at an axial direction of the second clutch member 552, wherein the threaded section 511d of the shaft 511b is screwed with the threaded hole 552b of the second clutch member 552. The predetermined resistance allowed the first clutch member 551 and the second clutch member 552 shift relatively could be adjusted by adjusting a threaded depth between the threaded section 511d of the shaft 511b and the threaded hole 552b of the second clutch member 552. In the current embodiment, an end 552c of the second clutch member 552 opposite to the second clutch teeth 552a is fixed in the through hole 122d. More specifically, the end 552c of the second clutch member 552 opposite to the second clutch teeth 552a has the second positioning hole 552d. During a process of assembling, the fixing member 17 passes through the first positioning hole 122e of the first pivot end 122b and the second positioning hole 552d of the second clutch member 552 to restrict the second clutch member 552 from rotating relative to the first pivot end 122b.

With the aforementioned design, the driving assembly 50 could be disposed on the first connecting shaft 22 which provides with the motor bracket 26 to provide a rotational force to either the first pivot 511 or the third pivot 513; the clutch assembly 55 could be disposed on either the first pivot 511 or the third pivot 513; alternatively, the driving assembly 50 could be disposed on the second connecting shaft 24 which provides with the motor bracket 26 to provide a rotational force to either the second pivot 512 or the fourth pivot 514; the clutch assembly 55 could be disposed on either the second pivot 512 or the fourth pivot 514, as long as the linkage assembly 20 could be driven to pivot to drive the moving portion 30 and the chain guide assembly 40 to move.

In an embodiment, the driving assembly 50 could be disposed on the fixing portion 10, wherein the first pivot 511 is fixed to the first connecting shaft 22, so that the driving assembly 50 exerts a force on the first pivot 511 to drive the linkage assembly 20 to pivot; alternatively, the second pivot 512 is fixed to the second connecting shaft 24, so that the driving assembly 50 exerts a force on the second pivot 512 to drive the linkage assembly 20 to pivot.

Figure 12:
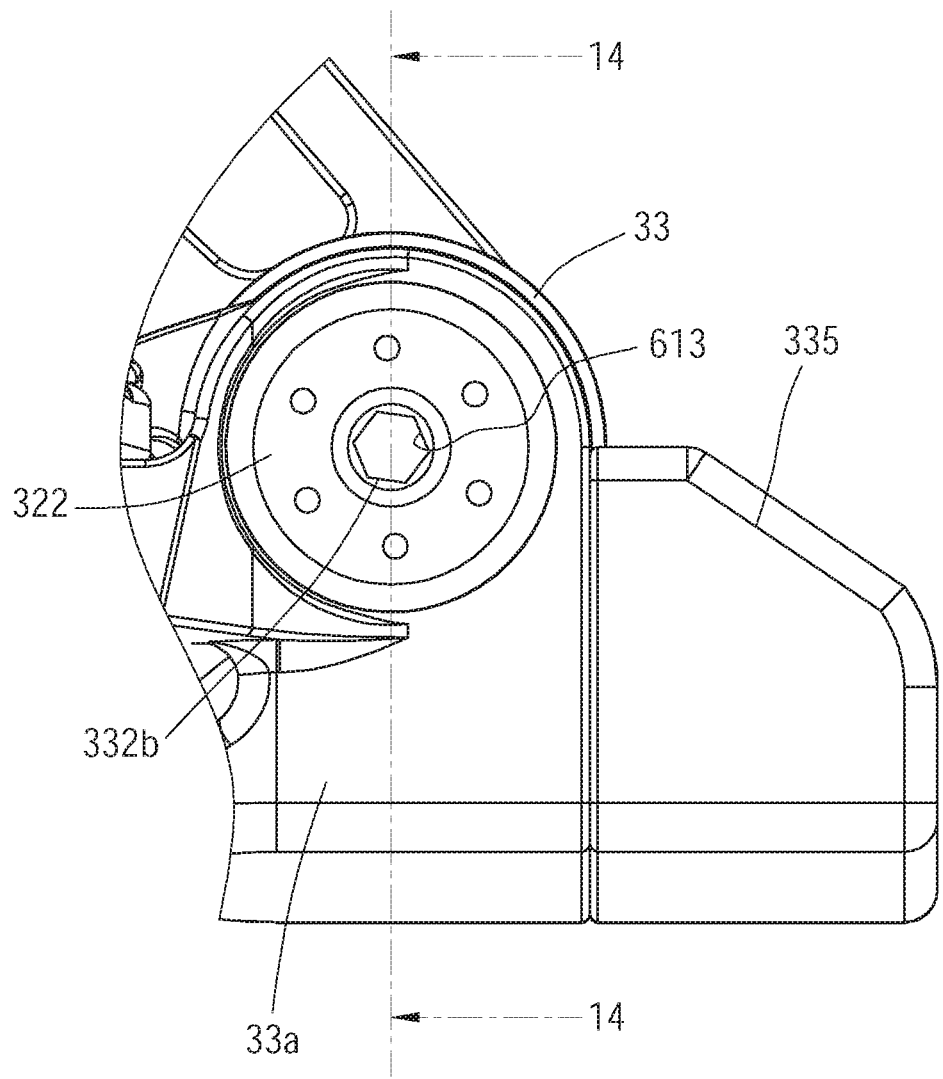
FIG. 12 is a partially side view of the moving portion according to the embodiment of the present disclosure.
Figure 13:
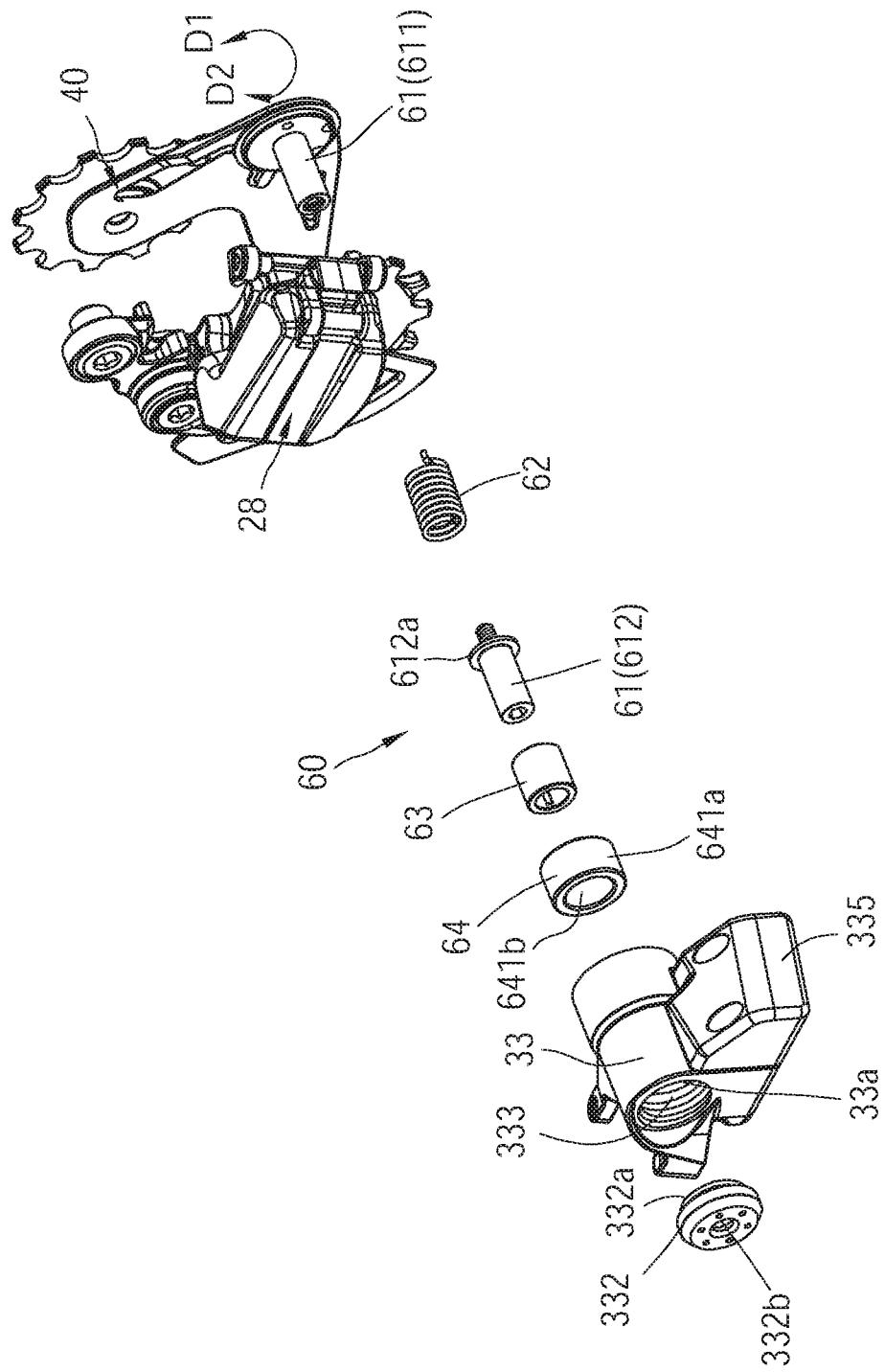
FIG. 13 is a partially exploded view of the rear derailleur according to the embodiment of the present disclosure.
Figure 14:
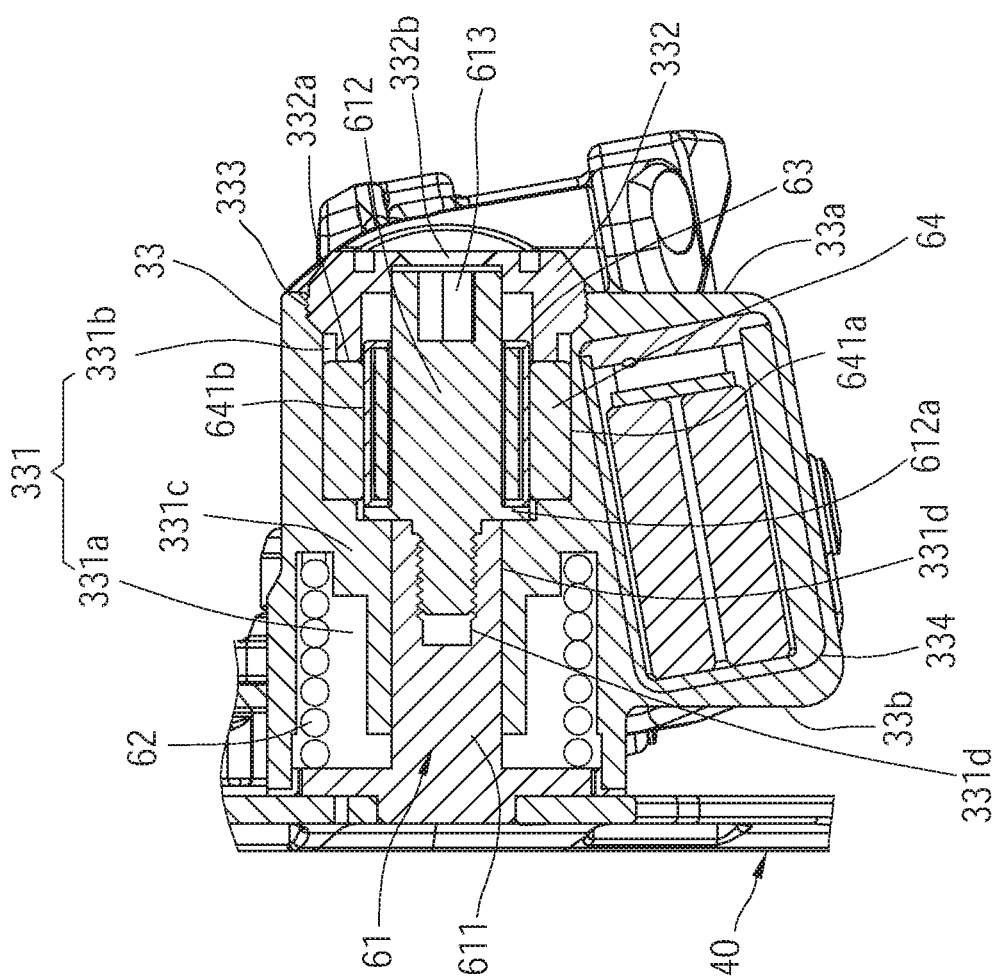
FIG. 14 is a sectional view along the 14-14 line in FIG. 12.
Figure 15:
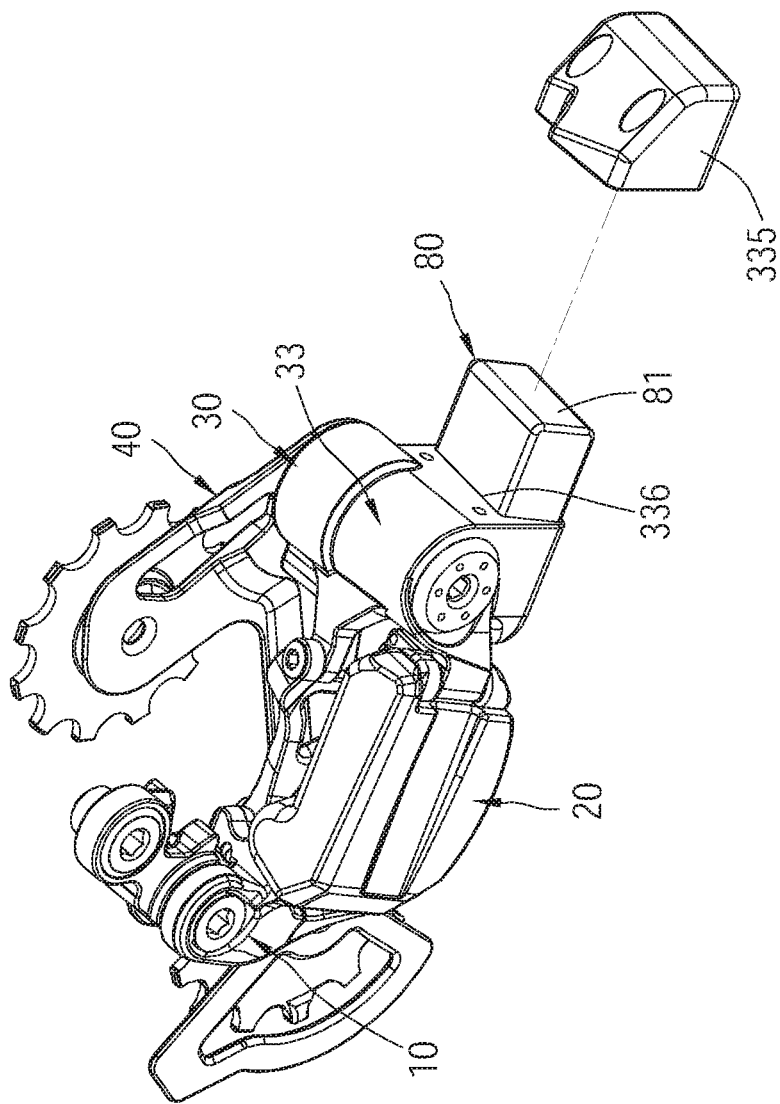
FIG. 15 is a partially exploded view of the rear derailleur according to the embodiment of the present disclosure.
Figure 16:
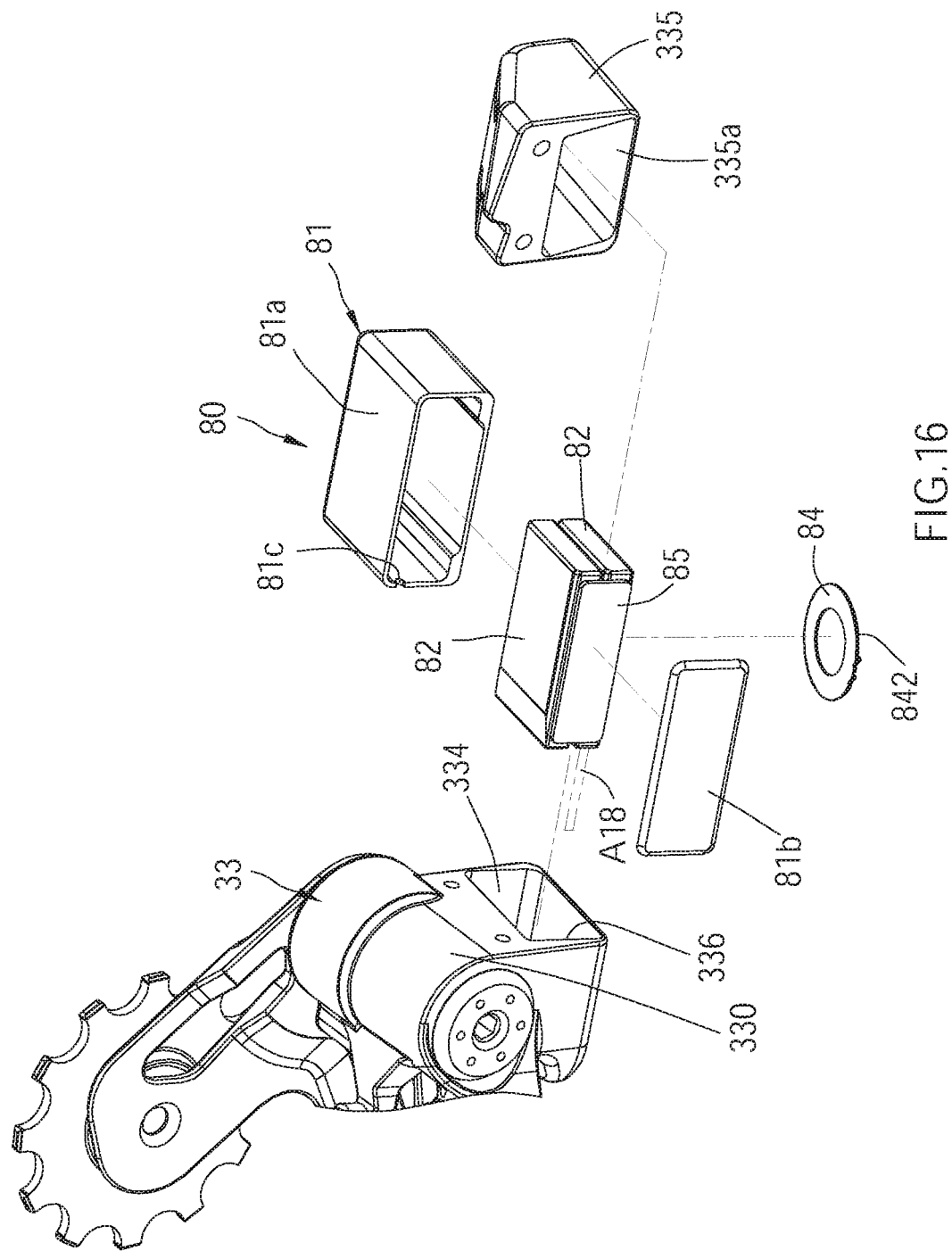
FIG. 16 is a partially exploded view of the rear derailleur according to the embodiment of the present disclosure.
Figure 17:
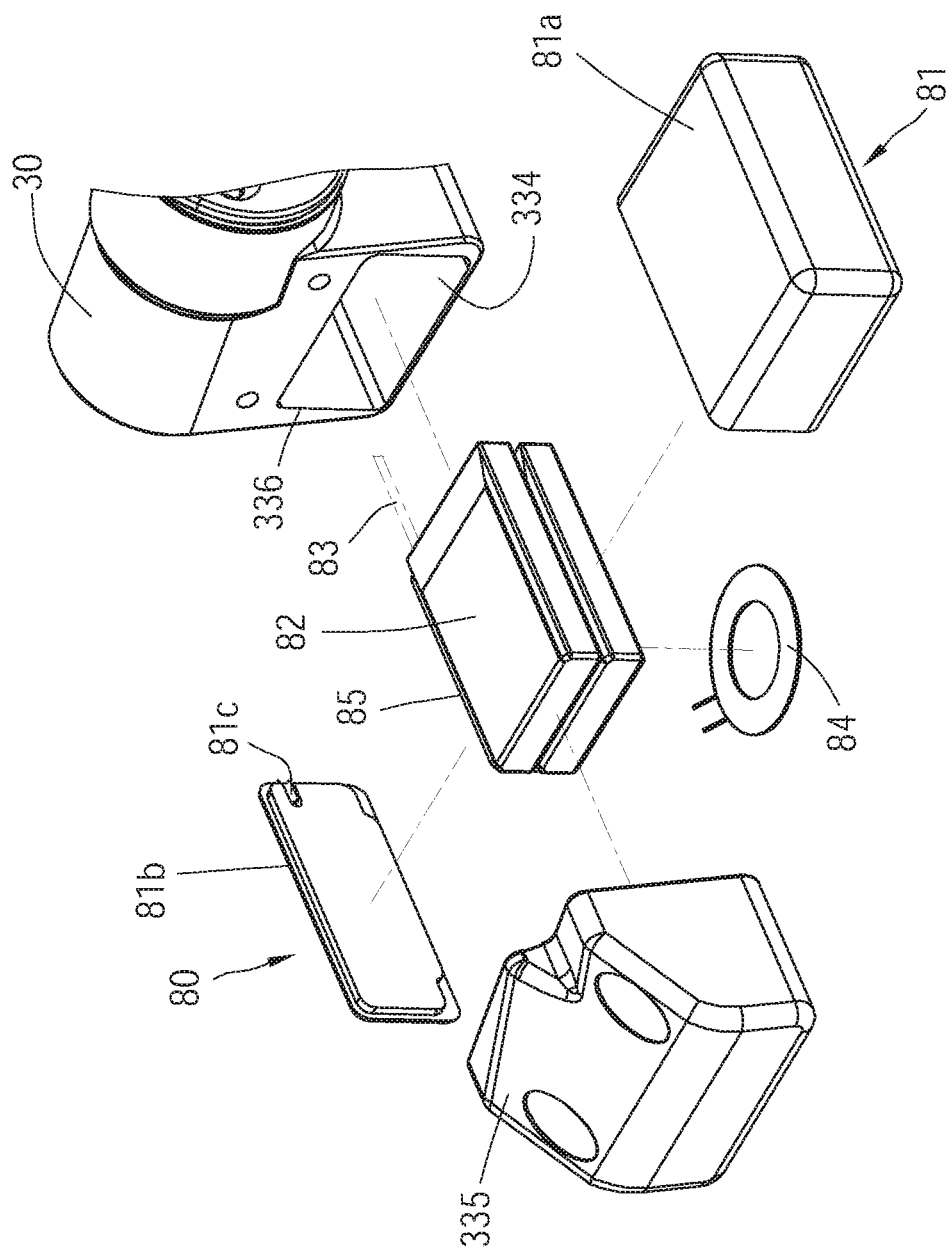
FIG. 17 is a partially exploded view of the rear derailleur according to the embodiment of the present disclosure.

In the current embodiment, the chain guide assembly 40 could pivot relative to the moving portion 30. Referring to FIG. 12 to FIG. 14, the moving portion 30 includes a housing 33 and a rotating assembly 60, wherein the third pivot portion 31 and the fourth pivot portion 32 of the moving portion 30 are respectively disposed on the housing 33, and the housing 33 has a first receiving space 331 and a first cover 332. The rotating assembly 60 is disposed in the first receiving space 331, and the first receiving space 331 is covered by the first cover 332, preventing the rotating assembly 60 from being affected by moisture or dust.

The rotating assembly 60 includes a pivot shaft 61 (p-knuckle), an elastic member 62, a bearing 63, and a damping member 64, wherein an end of the pivot shaft 61 is connected to the chain guide assembly 40. The elastic member 62 of the rotating assembly 60 fits around the pivot shaft 61, wherein an end of the elastic member 62 of the rotating assembly 60 is connected to the chain guide assembly 40, thereby to provide a torque in a first rotation direction D1 to the pivot shaft 61. In the current embodiment, the elastic member 62 is a torsional spring. The damping member 64 is disposed between the pivot shaft 61 and an inner wall of the first receiving space 331. More specifically, the bearing 63 fits around the pivot shaft 61 without physically connecting with the elastic member 62. The damping member 64 fits around the bearing 63 and has an outer abutted surface 641a and an inner abutted surface 641b. An inner periphery of the bearing 63 is in contact with the pivot shaft 61, wherein an outer periphery of the bearing 63 abuts against the inner abutted surface 641b of the damping member 64, and the outer abutted surface 641a of the damping member 64 abuts against the inner wall of the first receiving space 331. In the current embodiment, the bearing 63 is a one way bearing. When the rotating assembly 60 rotates in the first rotation direction D1, the inner periphery and the outer periphery of the bearing 63 could rotate relatively. When the rotating assembly 60 rotate in a second rotation direction D2 opposite to the first rotation direction D1, the inner periphery and the outer periphery of the bearing 63 could not rotate relatively, thereby making the damping member 64 provides a predetermined friction for preventing the moving portion 30 from loosening due to an effect that an external force or a vibration exerts on the rotating assembly 60.

More specifically, when the chain guide assembly 40 is driven by the driving assembly 50 to pivot to be engaged with the sprockets with different radiuses, a position of the chain changes to make the chain guide assembly 40 rotated by a chain tension. At this time, the chain guide assembly 40 drives the rotating assembly 60 to rotate in the second rotation direction D2. When the rotating assembly 60 rotates in the second rotation direction D2, a friction is generated between the inner abutted surface 641b of the damping member 64 and the bearing 63, and another friction is generated between the outer abutted surface 641a of the damping member 64 and the inner wall of the first receiving space 331, thereby to provide a damping effect, preventing the chain guide assembly 40 from excessive shaking or vibrating due to a vibration or an external force which may cause the chain to jump and affect the engagement between the chain and the sprocket or cause a chain drop.

In the current embodiment, the damping member 64 is cylindrical for providing an abutting force on the bearing 63. In other embodiments, the damping member 64 could be a plurality of blocks distributed on a radial periphery of the bearing 63. The damping member 64 could be made of rubber, polyurethane, or other elastic material which allows the damping member 64 to deform in a radial direction of the damping member 64 when the damping member 64 is squeezed or pressed.

The first cover 332 of the moving portion 30 constitutes an adjusting member, wherein the first cover 332 is engaged with the housing 33 and is adapted to axially exerts a force on the damping member 64, so that the damping member 64 is pushed to deform in the radial direction of the damping member 64, thereby to change the friction that the outer abutted surface 641a exerts on the inner wall of the first receiving space 331 and to change the friction that the inner abutted surface 641b exerts on the bearing 63, so as to change the friction between the outer abutted surface 641a of the damping member 64 and the inner wall of the first receiving space 331 and to change the friction between the inner abutted surface 641b of the damping member 64 and the outer periphery of the bearing 63.

In the current embodiment, the housing 33 has an outer surface 33a away from the chain guide assembly 40, wherein a mounting hole 333 is disposed on the outer surface 33a at where the first cover 332 corresponds to, and communicates with the first receiving space 331. During a process of assembling, the first cover 332 enters the first receiving space 331 via the mounting hole 333 and is engaged with the mounting hole 333 by a threaded portion on the first cover 332. The first cover 332 has an extending portion 332a extending toward an axial direction of the chain guide assembly 40, wherein the extending portion 332a of the first cover 332 abuts against an end of the damping member 64. By adjusting a relative depth between the first cover 332 and the housing 33, the extending portion 332a could be driven to axially push the damping member

64, so that the damping member 64 deforms in the radial direction of the damping member 64. In this way, a damping force generated by the damping member 64 could be adjusted by adjusting a position of the first cover 332 that engages with the mounting hole 333 of the housing 33.

In the current embodiment, the first receiving space 331 includes a first chamber 331*a* and a second chamber 331*b*, wherein a dividing member 331*c* is disposed between the first chamber 331*a* and the second chamber 331*b* and has a through hole 331*d*. The first chamber 331*a* communicates with the second chamber 331*b* via the through hole 331*d*. The first chamber 331*a* is located between the second chamber 331*b* and the chain guide assembly 40. During a process of assembling, the elastic member 62 of the rotating assembly 60 is disposed in the first chamber 331*a*, wherein an end of the elastic member 62 of the rotating assembly 60 is disposed on the chain guide assembly 40, and another end of the elastic member 62 of the rotating assembly 60 is disposed on a surface of the dividing member 331*c*, and then the pivot shaft 61 passes through the elastic member 62 of the rotating assembly 60 and the through hole 331*d* of the dividing member 331*c*; the bearing 63 and the damping member 64 are disposed in the second chamber 331*b*, wherein the bearing 63 fits around the pivot shaft 61, and the damping member 64 fits around the bearing 63, and then the first cover 332 covers the mounting hole 333. An end of the damping member 64 abuts against another surface of the dividing member 331*c*, and another end of the damping member 64 abuts against the extending portion 332*a* of the first cover 332. In this way, the damping force could be adjusted by squeezing the damping member 64 via both of the dividing member 331*c* and the extending portion 332*a* of the first cover 332 to evenly deforms two ends of the damping member 64.

In the current embodiment, the pivot shaft 61 includes a first portion 611 and a second portion 612, wherein the first portion 611 is connected to the chain guide assembly 40, and the second portion 612 is detachably connected to the first portion 611, and the first portion 611 is screwed with the second portion 612. The first portion 611 of the pivot shaft 61 and the elastic member 62 are disposed in the first chamber 331*a*, and the second portion 612 of the pivot shaft 61 is disposed in the second chamber 331*b*. In addition, the second portion 612 of the pivot shaft 61 has a flange 612*a* extending in a radial direction of the pivot shaft 61, wherein the flange 612*a* is adjacent to the dividing member 331*c*. When the bearing 63 fits around the second portion 612 of the pivot shaft 61, an end of the bearing 63 faces the flange 612*a*, and another end of the bearing 63 faces the mounting hole 333. An end of the second portion 612 has an engaging hole 613 (e.g. a hexagonal hole) for being engaged with a tool to rotate the second portion 612. When the second portion 612 screws off in a direction of the mounting hole 333, the flange 612*a* abuts against the bearing 63 to push the bearing 63 toward the mounting hole 333, which facilitates the user to take out the bearing 63.

The first cover 332 has a through hole 332*b* disposed corresponding to the engaging hole 613 of the second portion 612, wherein a diameter of the through hole 332*b* of the first cover 332 is greater than a diameter of the engaging hole 613. A tool could insert into the engaging hole 613 via the through hole 332*b* of the first cover 332 to rotate the second portion 612. In this way, the second portion 612 of the pivot shaft 61 could be disengaged from the first portion 611 without detaching the bearing 63 and the damping member 64, which facilitates the user to replace the worn elastic member 62.

The aforementioned damping structure of the moving portion 30 is not limited to be applied to the electronic rear derailleur 100 according to the embodiment of the present disclosure, but could be applied to other rear derailleurs which are not driven by the motor for providing damping effect to the chain guide assembly 40. In other embodiments, the driving assembly could be connected to the linkage assembly 20 via a cable, thereby to drive the linkage assembly 20 to pivot.

As shown in FIG. 15 to FIG. 20, in the current embodiment, the rear derailleur 100 further includes a detachable battery module 80 for providing electric power to the motor 52, the circuit board 56, and the magnetic sensor 58.

The battery module 80 is disposed on the moving portion 30. The housing 33 of the moving portion 30 further has a second receiving space 334, wherein the battery module 80 is disposed in the second receiving space 334 and is electrically connected to the circuit board 56, thereby to provide electricity to the motor 52 via the circuit board 56. The first receiving space 331 and the second receiving space 334 extend in different directions without communicating with each other, wherein the second receiving space 334 is located on an outer periphery of a wall of the first receiving space 331 in the radial direction of the pivot shaft 61. In the current embodiment, the second receiving space 334 is closer to a ground than the first receiving space 331 (i.e., the second receiving space 334 is lower than the first receiving space 331). Preferably, a minimum thickness T between a wall of the second receiving space 334 and the wall of the first receiving space 331 is smaller than or equal to 5 mm.

The housing 33 includes a body 330 and a second cover 335, wherein the body 330 has the first receiving space 331 and at least a part of the second receiving space 334, and the second cover 335 covers the second receiving space 334. An outer surface of the housing 33 has an opening 336 communicating with the second receiving space 334. In the current embodiment, the opening 336 of the housing 33 is disposed on a side wall of the housing 33 away from the linkage assembly 20. In other embodiments, the opening 336 of the housing 33 could be disposed on a side wall (not shown) away from the chain guide assembly 40. The second cover 335 is engaged with the side wall which provides with the opening 336 of the housing 33 and covers the opening 336 of the housing 33. The second cover 335 has a space 335*a* which constitutes a part of the second receiving space 334. In the current embodiment, a part of the battery module 80 is disposed in a part of the second receiving space 334 of the body 330, and another part of the battery module 80 protrudes out of the opening 336 of the housing 33 and is disposed in the space 335*a* of the second cover 335.

Figure 18:
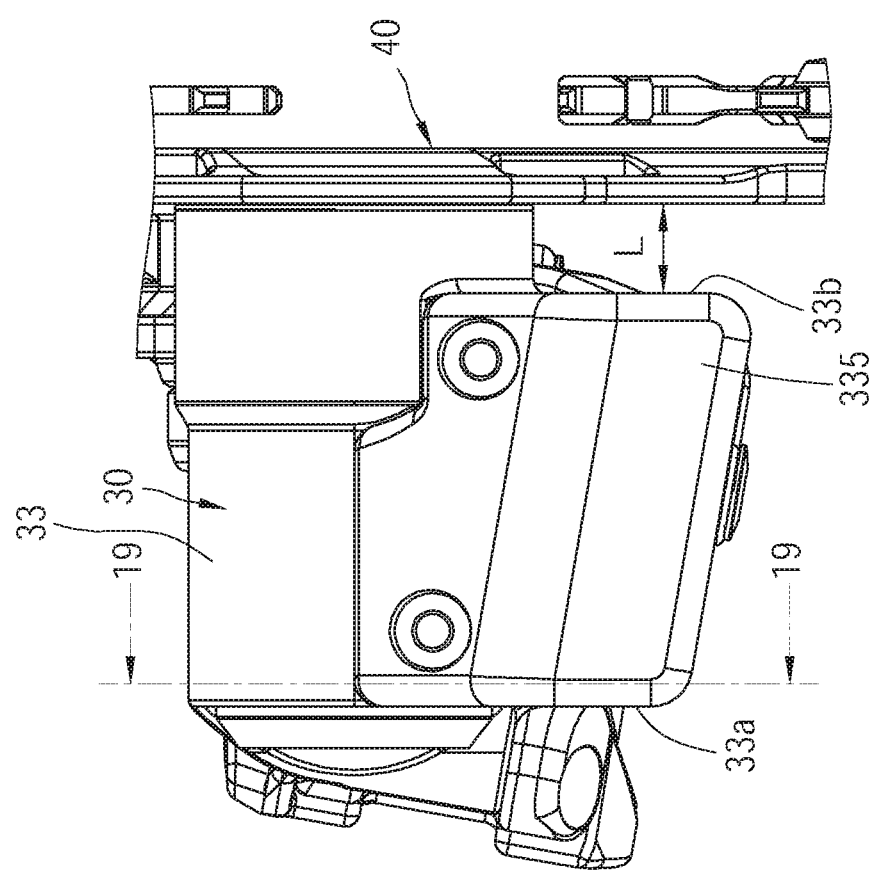
FIG. 18 is a partially side view of the moving portion according to the embodiment of the present disclosure.

The housing 33 has an inner surface 33*b* (as shown in FIG. 18) facing the chain guide assembly 40, wherein the inner surface 33*b* and the outer surface 33*a* of the housing 33 face opposite directions. The second receiving space 334 of the housing 33 is located between the outer surface 33*a* of the housing 33 and the inner surface 33*b* of the housing 33. The inner surface 36*b* and the chain guide assembly 40 are spaced from each other by a distance L, thereby the battery module 80 would not easily collide with the chain. Preferably, the distance L between the inner surface 36*b* and the chain guide assembly 40 is greater than or equal to 1 cm.

Figure 19:
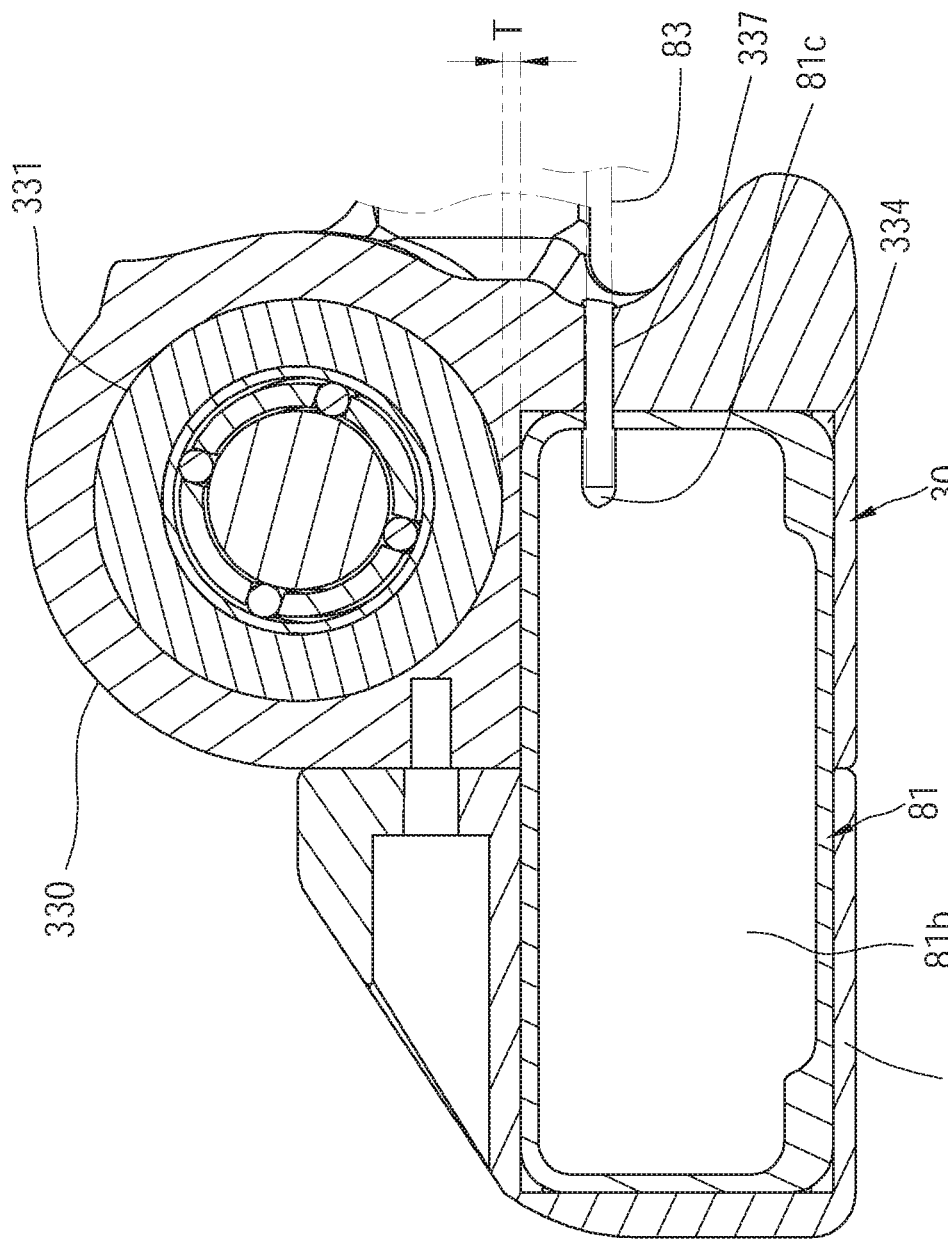
FIG. 19 is a sectional view along the 19-19 line in FIG. 18.

The housing 33 has a cord hole 337 (as shown in FIG. 19) communicating the second receiving space 334 and outside of the housing 33. The battery module 80 includes a battery box 81, two batteries 82, and a power cord 83, wherein the batteries 82 are disposed on a box body 81*a* of the battery box 81 and are covered by a box cover 81*b* of the battery box 81. The battery box 81 has a perforation 81c communicating inside the battery box 81 and outside the battery box 81, wherein the perforation 81c corresponds to the cord hole 337. The batteries 82 transmits electric power by the power cord 83, wherein the power cord 83 is connected to the driving assembly 50 by passing through the perforation 81c of the battery box 81 and the cord hole 337. In practice, the batteries 82 are not limited to be two. In other embodiments, the battery box 81 could provide with at least one battery 82.

Figure 20:
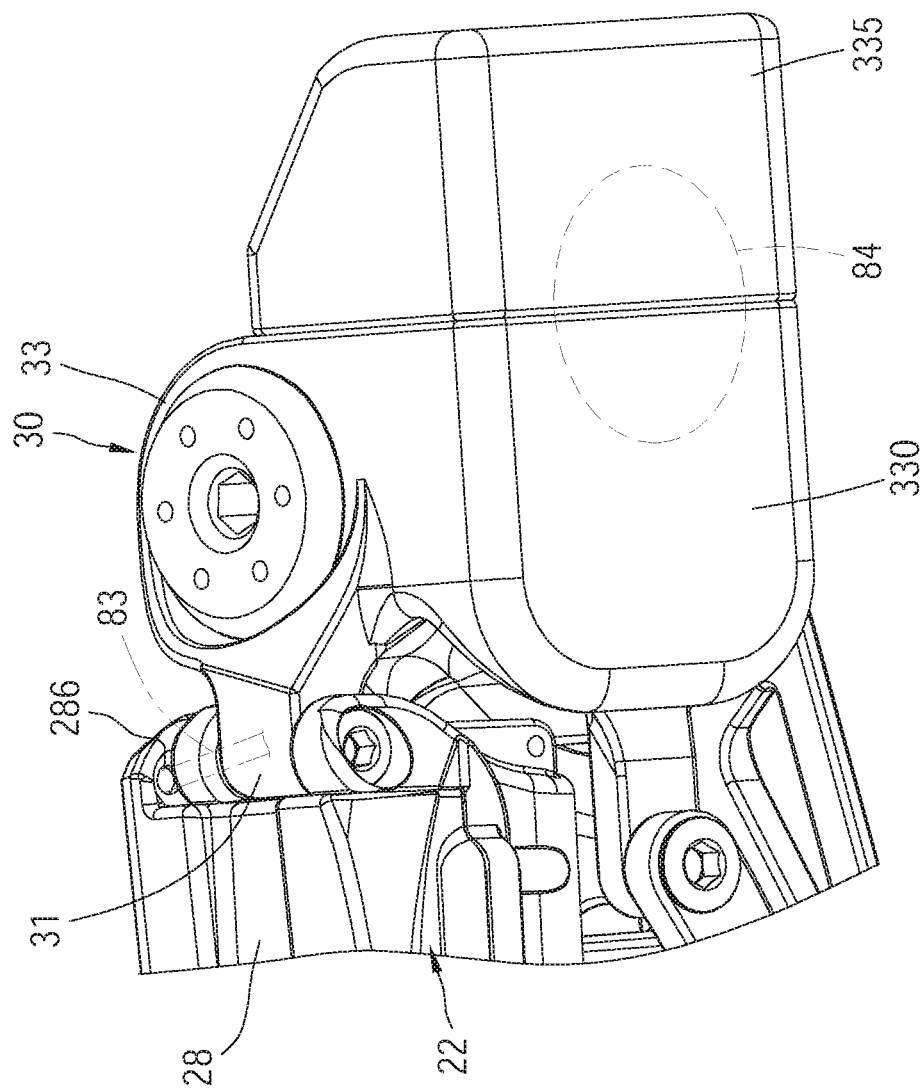
FIG. 20 is a partially perspective view of the rear derailleur according to the embodiment of the present disclosure.

As shown in FIG. 20, the case 28 of the first connecting shaft 22 has a cord hole 286 communicating inside and outside the case 28 and is adapted to be passed through by the power cord 83, wherein the cord hole 286 of the case 28 is adjacent to the first pivot portion 31 of the moving portion 30.

In the current embodiment, the batteries 82 are, but not limited to, rechargeable batteries. The battery module 80 further includes a coil 84 and a wireless charging circuit 85, wherein the wireless charging circuit 85 is electrically connected to the coil 84 and the batteries 82. The coil 84 is adapted to receive an external charging power and converts the external charging power to electric power to the wireless charging circuit 85, and the wireless charging circuit 85 converts the electric power to electricity and sends the electricity to the batteries 82 for charging. The coil 84 has a receiving surface 842 for receiving the external charging power and is disposed on the fixing portion 10, the linkage assembly 20, or the moving portion 30. Preferably, the coil 84 is disposed on a component located away from the chain guide assembly 40. The receiving surface 842 of the coil 84 faces an outside direction of the fixing portion 10, the linkage assembly 20, or the moving portion 30, so that an interference between a wireless charging device (not shown) and the coil 84 could be reduced during charging, and providing a better stability when supplying charging power to the coil 84.

In the current embodiment, the wireless charging circuit 85 is located inside the battery box 81, and the power cord 83 is electrically connected to the wireless charging circuit 85. The coil 84 is disposed on a bottom inside the battery box 81 and is located away from the rotating assembly 60, wherein the receiving surface 842 of the coil 84 is disposed on an outside direction opposite to the batteries 82 (i.e., the receiving surface 842 faces downward), thereby the wireless charging device (not shown) could provide charging power to the coil 84 via the housing 33 below.

Figure 21:
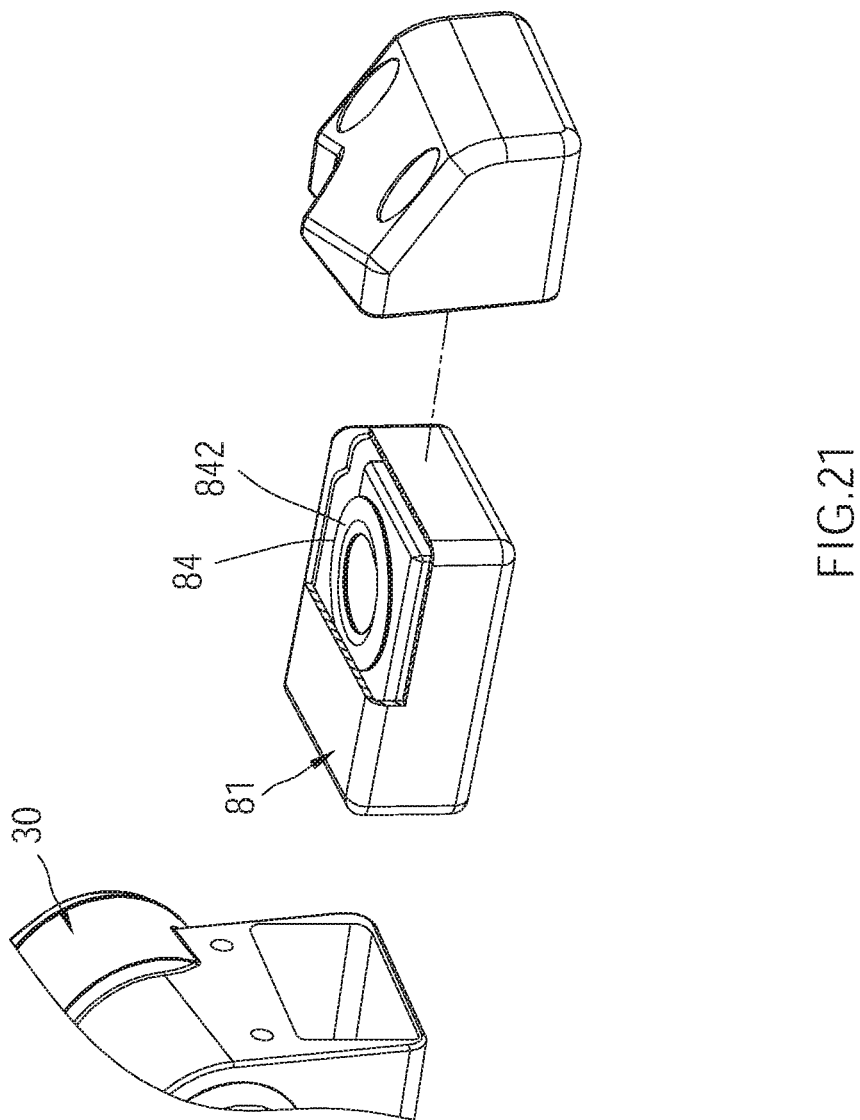
FIG. 21 is a partially perspective view of the rear derailleur according to another embodiment of the present disclosure.

In an embodiment shown in FIG. 21, the coil 84 is disposed on a top portion inside the battery box 81, wherein the receiving surface 842 of the coil 84 faces an upward direction of the moving portion 30 (i.e., the outside direction is an upward direction).

Figure 22:
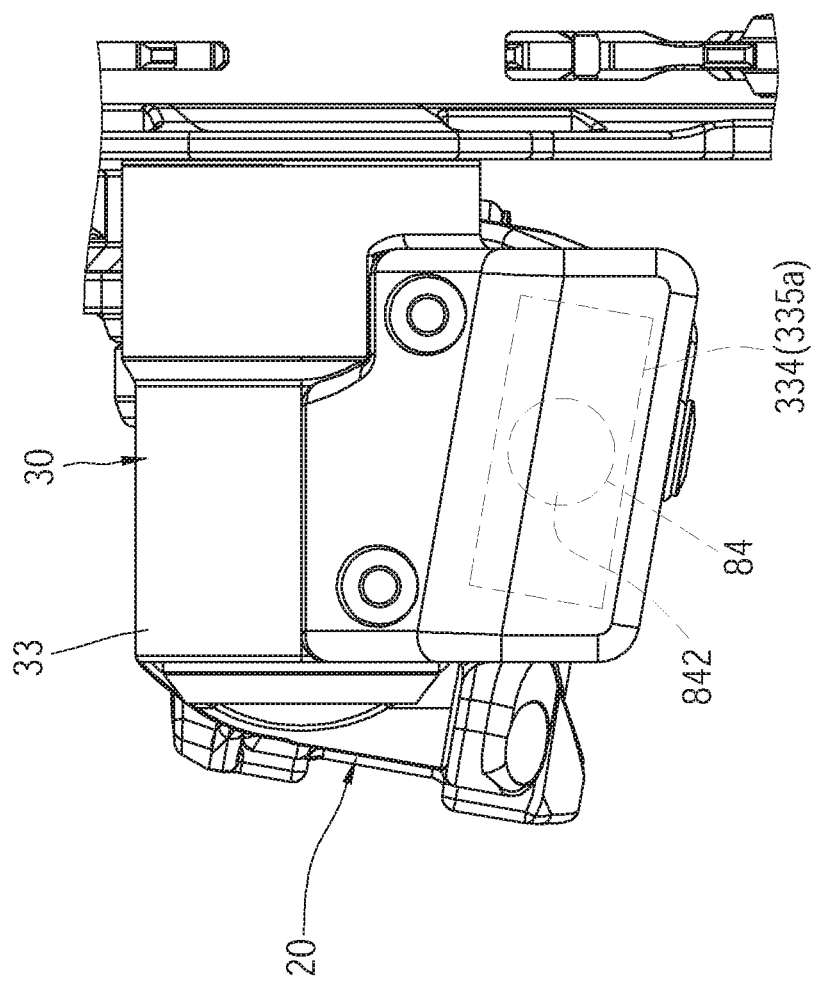
FIG. 22 is a partially side view of the rear derailleur according to still another embodiment of the present disclosure.
Figure 23:
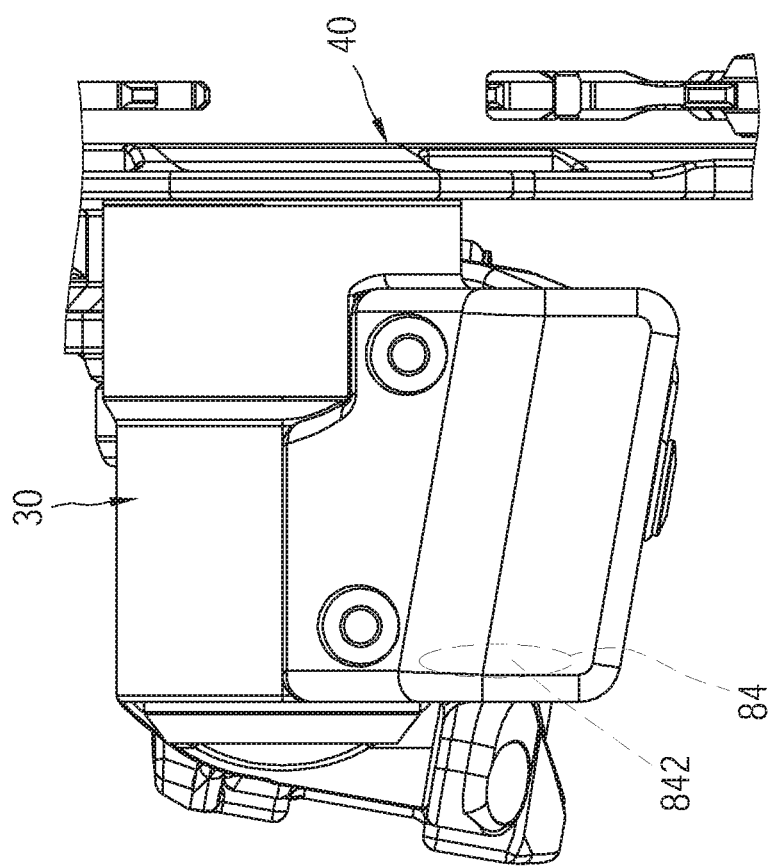
FIG. 23 is a partially side view of the rear derailleur according to still another embodiment of the present disclosure.

In an embodiment shown in FIG. 22, the coil 84 is disposed in the space 335a of the second cover 335, wherein the receiving surface 842 is disposed on an outside direction away from the linkage assembly 20 and faces an inner wall of the second cover 335. In an embodiment shown in FIG. 23, the receiving surface 842 of the coil 84 faces an outside direction of the moving portion 30 away from the chain guide assembly 40.

Figure 24:
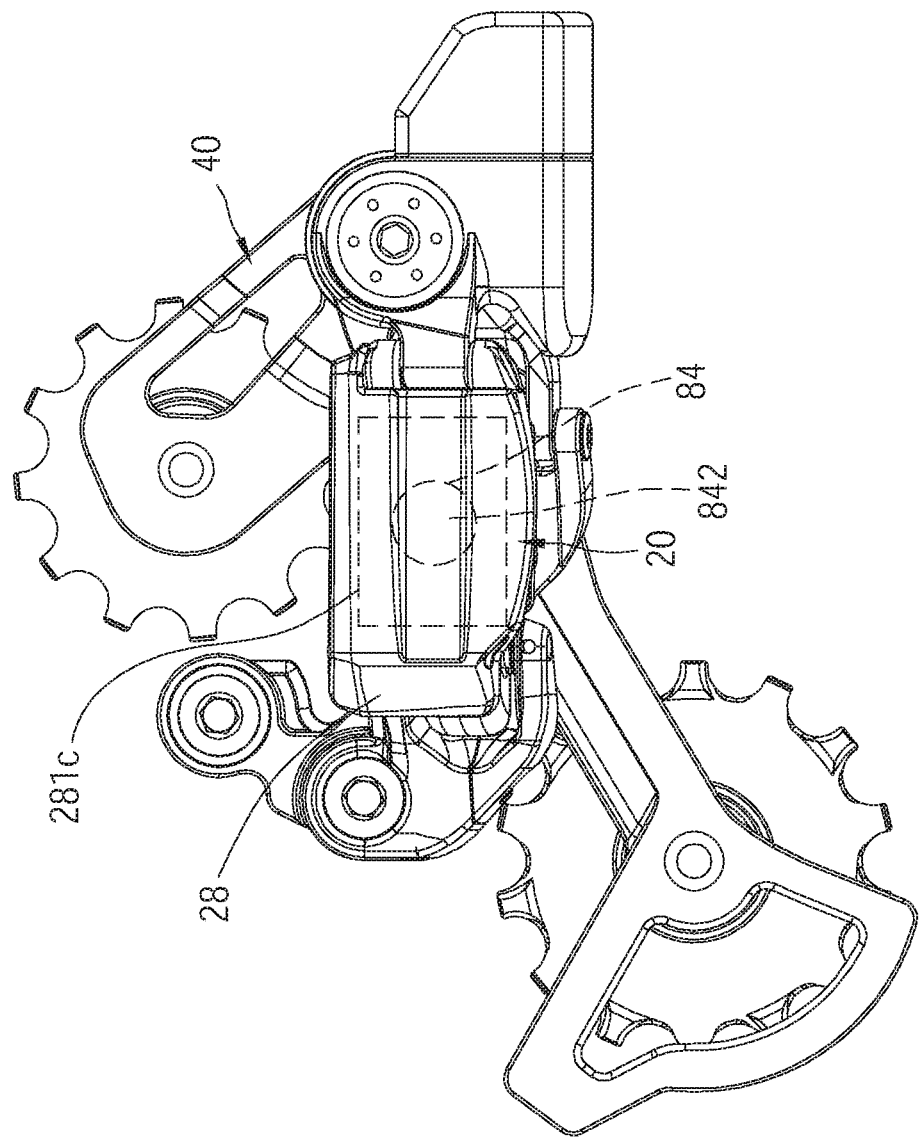
FIG. 24 is a side view of the rear derailleur according to still another embodiment of the present disclosure.

In an embodiment shown in FIG. 24, the coil 84 is located in the receiving slot 281c of the case 28 of the linkage assembly 20, wherein the receiving surface 842 faces an outside direction of the linkage assembly 20 away from the chain guide assembly 40.

Figure 25:
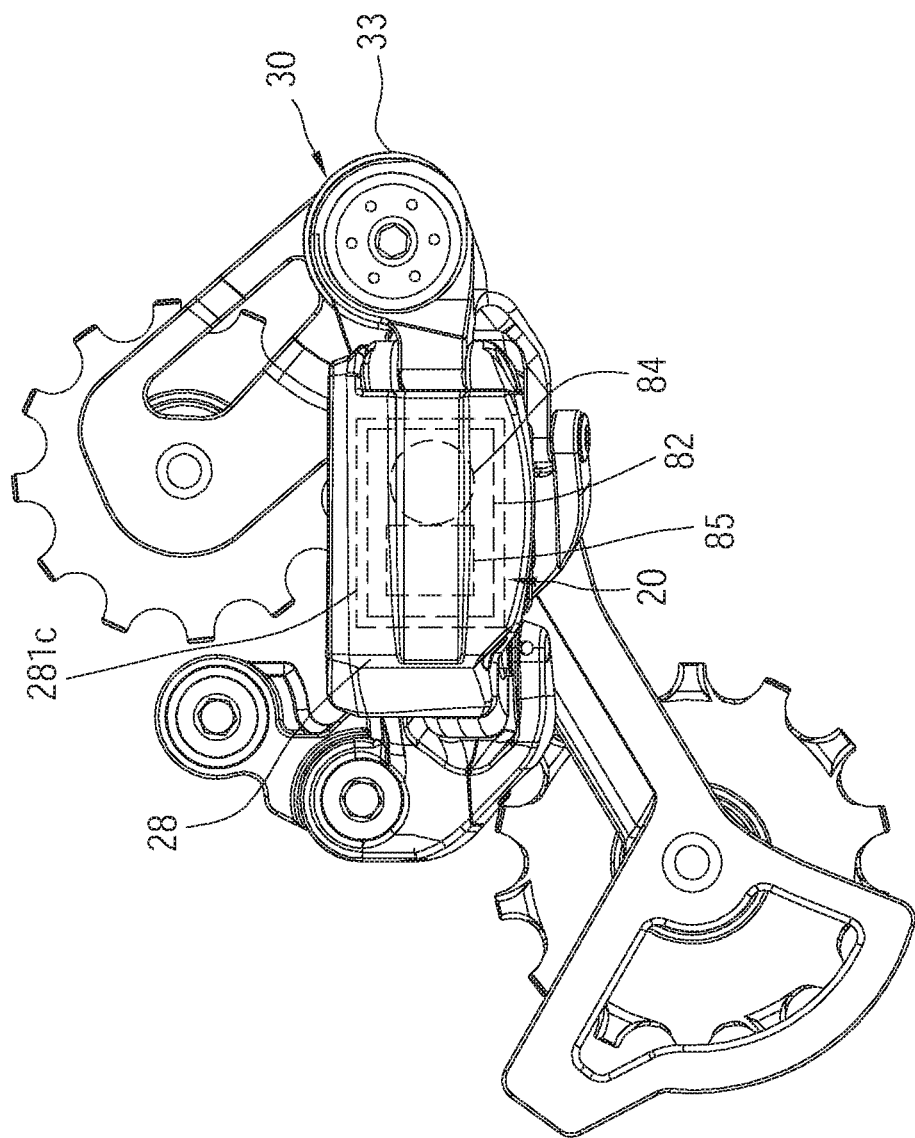
FIG. 25 is a side view of the rear derailleur according to still another embodiment of the present disclosure.

In an embodiment shown in FIG. 25, the batteries 82, the coil 84, and the wireless charging circuit 85 are disposed in the receiving slot 281c of the case 28 of the linkage assembly 20, wherein the housing 33 of the moving portion 30 does not provide with the second chamber.

Figure 26:
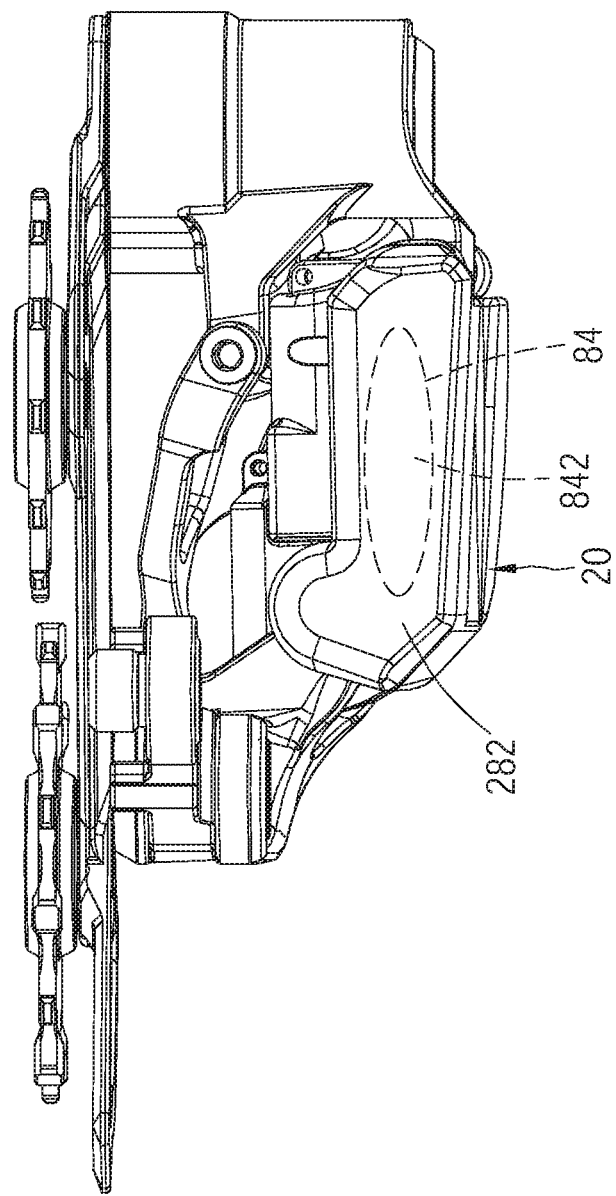
FIG. 26 is a top view of the rear derailleur according to still another embodiment of the present disclosure.

In an embodiment shown in FIG. 26 which is similar to FIG. 25, the coil 84 is disposed inside the cover 282 of the linkage assembly 20, wherein the receiving surface 842 faces an inner wall of the cover 282 (i.e., the receiving surface 842 faces an upward direction of the linkage assembly 20).

Figure 27:
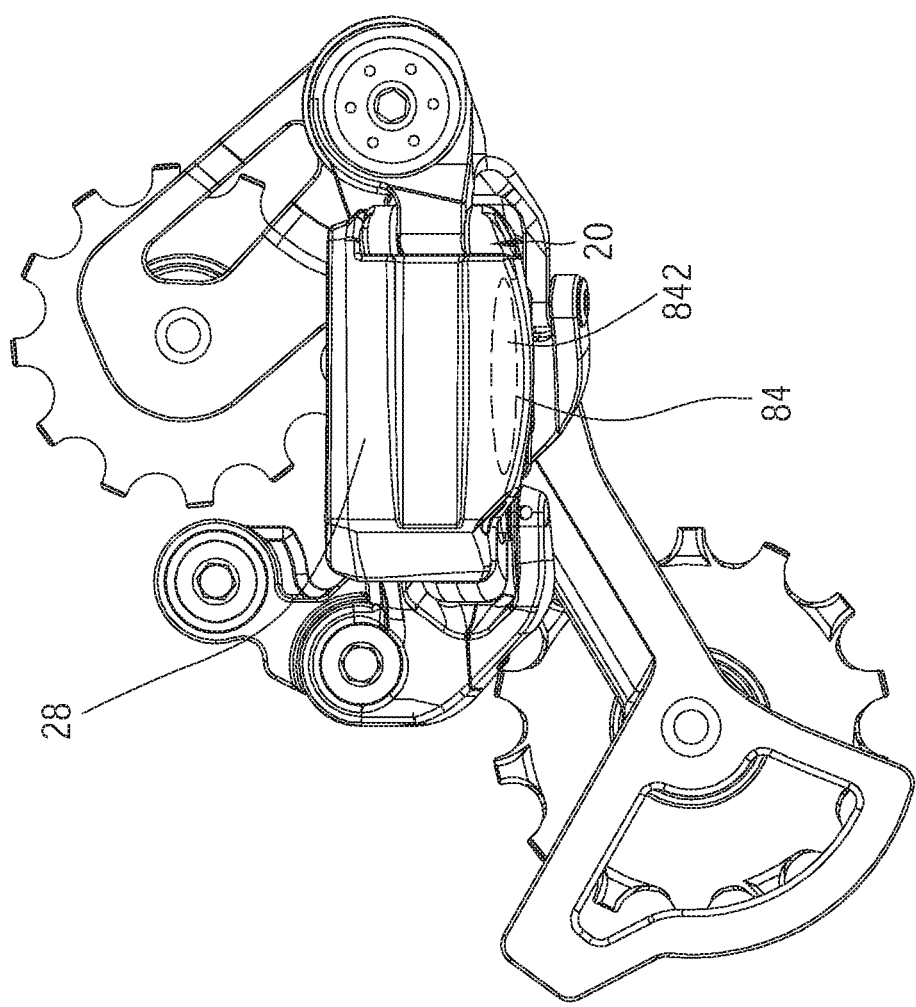
FIG. 27 is a side view of the rear derailleur according to still another embodiment of the present disclosure.

In an embodiment shown in FIG. 27, the coil 84 is disposed on a bottom of the case 28 of the linkage assembly 20, wherein the receiving surface 842 is located away from the cover 282 (i.e., the receiving surface 842 faces a downward direction of the linkage assembly 20).

In an embodiment shown in FIG. 28, the fixing portion 10 includes a housing 12a, wherein the batteries 82, the wireless charging circuit 85, and the coil 84 are disposed in the housing 12a, and the receiving surface 842 faces a direction of the fixing portion 10 away from the chain guide assembly 40. In other embodiments, the receiving surface 842 of the coil 84 could face an upper direction, a downward direction, or an outside direction of the fixing portion 10 away from the linkage assembly 20.

In conclusion, the rear derailleur of the present disclosure has following advantages.

1. The clutch assembly 55 which could be disposed on either the first connecting shaft 22 or the second connecting shaft 24 could engage and disengage power transmission when the linkage assembly 20 is hit by an external force, thereby to prevent the driving gear assembly 54 or the output shaft 521 of the motor 52 from damaging. In addition, when the moving portion 30 is blocked or is get stuck, the clutch assembly 55 could engage and disengage power transmission for preventing the motor 52 from overheating.

2. The driving assembly 50 is disposed on the linkage assembly 20, thereby the overall size of the rear derailleur 100 could be reduced, improving the problem that the overall size of the conventional electronic rear derailleur is too large.

3. The battery module 80 is disposed on the rear derailleur 100, thereby the power supplying distance could be shortened, simplifying the layout of the power cord 83.

4. By utilizing inductive charging technology and by disposing the coil for inductive charging on the components of the rear derailleur, the rechargeable batteries of the rear derailleur 100 could be charged more conveniently, without the need to set a charging interface on the battery module 80, preventing the batteries from damaging due to the worn charging interface.

5. The damping member 64 cooperates with the bearing 63 to provide a damping effect, thereby to slow down the swinging speed of the chain guide assembly 40, preventing the chain from jumping which may affect the engagement between the chain and the sprockets or cause a chain drop.

It must be pointed out that the embodiments described above are only some embodiments of the present disclosure. All equivalent structures which employ the concepts disclosed in this specification and the appended claims should fall within the scope of the present disclosure.

What is claimed is:

1. A rear derailleur of a bicycle, comprising:
  a fixing portion which is adapted to be connected to a frame of the bicycle and has a first pivot portion and a second pivot portion;
  a linkage assembly comprising a first connecting shaft and a second connecting shaft, wherein an end of the first connecting shaft is pivotally connected to the first pivot portion via a first pivot, and an end of the second connecting shaft is pivotally connected to the second pivot portion via a second pivot;
a moving portion having a third pivot portion and a fourth pivot portion, wherein the third pivot portion is pivotally connected to the first connecting shaft via a third pivot, and the fourth pivot portion is pivotally connected to the second connecting shaft via a fourth pivot;
a chain guide assembly connected to the moving portion; and
a driving assembly disposed on one of the first connecting shaft and the second connecting shaft, wherein the driving assembly comprises a motor and a driving gear assembly; an output shaft of the motor is connected to the driving gear assembly; the driving gear assembly is adapted to drive one of the first pivot, the second pivot, the third pivot, and the fourth pivot to drive the linkage assembly to pivot, thereby to drive the moving portion and the chain guide assembly to move;
wherein the linkage assembly comprises a motor bracket disposed on one of the first connecting shaft and the second connecting shaft; the motor is disposed on the motor bracket;
wherein a magnet is disposed on an end of one of the first pivot, the second pivot, the third pivot, and the fourth pivot which provides with the fixing member away from the fixing member; a magnetic sensor is disposed on one of the first connecting shaft and the second connecting shaft which provides with the motor bracket at where the magnet corresponds to.

2. The rear derailleur of claim 1, wherein the driving assembly is disposed on the first connecting shaft.

3. The rear derailleur of claim 2, wherein the driving gear assembly is connected to the first pivot.

4. The rear derailleur of claim 2, wherein the driving gear assembly is connected to the third pivot.

5. The rear derailleur of claim 1, wherein the driving assembly is disposed on the second connecting shaft.

6. The rear derailleur of claim 5, wherein the driving gear assembly is connected to the second pivot.

7. The rear derailleur of claim 5, wherein the driving gear assembly is connected to the fourth pivot.

8. The rear derailleur of claim 1, further comprising a fixing member, wherein a positioning hole is disposed on one of the first pivot, the second pivot, the third pivot, and the fourth pivot which is connected to the driving gear assembly; another positioning hole is disposed on one of the first pivot portion, the second pivot portion, the third pivot portion, and the fourth pivot portion which is connected to one of the first pivot, the second pivot, the third pivot, and the fourth pivot; the fixing member passes through the positioning hole and the another positioning hole to fix a relative position between the positioning hole and the another positioning hole.

9. The rear derailleur of claim 1, wherein the motor bracket and one of the first connecting shaft and the second connecting shaft which provides with the motor bracket are integrally formed as a monolithic unit.

10. The rear derailleur of claim 1, wherein the linkage assembly comprises a case engaged with the motor bracket; the magnetic sensor is disposed in the case.

11. The rear derailleur of claim 10, wherein the case has a receiving slot; the driving assembly comprises a circuit board disposed in the receiving slot; the magnetic sensor is electrically connected to the circuit board.

12. The rear derailleur of claim 11, wherein the case comprises a case body and a cover; the case body has the receiving slot; the cover is engaged with the case body and close an opening of the receiving slot.

13. The rear derailleur of claim 12, wherein a top portion of the case body has an extending portion extending to be above the magnet; the magnetic sensor is located above the extending portion; the cover covers the magnetic sensor and the extending portion.

14. The rear derailleur of claim 1, wherein the motor bracket has at least one receiving space; the motor and the driving gear assembly are disposed in the at least one receiving space.

15. The rear derailleur of claim 1, wherein a clutch assembly is disposed on one of the first pivot, the second pivot, the third pivot, and the fourth pivot, and comprises a first clutch member and a second clutch member which is abutted against the first clutch member in an axial direction of the clutch assembly; the first clutch member has a plurality of first clutch teeth extending toward the second clutch member; the second clutch member has a plurality of second clutch teeth extending toward the first clutch member; the second clutch teeth is meshed with the first clutch teeth.

16. A rear derailleur of a bicycle, comprising:
a fixing portion which is adapted to be connected to a frame of the bicycle and has a first pivot portion and a second pivot portion;
a linkage assembly comprising a first connecting shaft and a second connecting shaft, wherein an end of the first connecting shaft is pivotally connected to the first pivot portion via a first pivot, and an end of the second connecting shaft is pivotally connected to the second pivot portion via a second pivot;
a moving portion having a third pivot portion and a fourth pivot portion, wherein the third pivot portion is pivotally connected to the first connecting shaft via a third pivot, and the fourth pivot portion is pivotally connected to the second connecting shaft via a fourth pivot;
a chain guide assembly connected to the moving portion; and
a driving assembly disposed on one of the first connecting shaft and the second connecting shaft, wherein the driving assembly comprises a motor and a driving gear assembly; an output shaft of the motor is connected to the driving gear assembly; the driving gear assembly is adapted to drive one of the first pivot, the second pivot, the third pivot, and the fourth pivot to drive the linkage assembly to pivot, thereby to drive the moving portion and the chain guide assembly to move;
wherein a clutch assembly is disposed on one of the first pivot, the second pivot, the third pivot, and the fourth pivot, and comprises a first clutch member and a second clutch member which is abutted against the first clutch member in an axial direction of the clutch assembly; the first clutch member has a plurality of first clutch teeth extending toward the second clutch member; the second clutch member has a plurality of second clutch teeth extending toward the first clutch member; the second clutch teeth is meshed with the first clutch teeth.

* * * * *